(12) United States Patent
Dunn et al.

(10) Patent No.: US 7,336,422 B2
(45) Date of Patent: Feb. 26, 2008

(54) SHEETING WITH COMPOSITE IMAGE THAT FLOATS

(75) Inventors: Douglas S. Dunn, Maplewood, MN (US); Robert L. W. Smithson, Mahtomedi, MN (US); Robert T. Krasa, Hudson, WI (US); Michael W. Dolezal, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 106 days.

(21) Appl. No.: 11/399,695

(22) Filed: Apr. 6, 2006

(65) Prior Publication Data

US 2006/0262411 A1    Nov. 23, 2006

Related U.S. Application Data

(63) Continuation-in-part of application No. 09/898,580, filed on Jul. 3, 2001, now Pat. No. 7,068,434, which is a continuation-in-part of application No. 09/510,428, filed on Feb. 22, 2000, now Pat. No. 6,288,842.

(51) Int. Cl.
*G02B 27/10* (2006.01)
*B42B 15/00* (2006.01)

(52) U.S. Cl. .................. 359/626; 283/85; 359/619

(58) Field of Classification Search ................ 359/455, 359/456, 619, 620, 625, 626, 627; 283/85
See application file for complete search history.

(56) References Cited

U.S. PATENT DOCUMENTS

| | | | |
|---|---|---|---|
| 1,905,716 A | 4/1933 | Ives | |
| 1,918,705 A | 7/1933 | Ives | |
| 2,039,648 A | 5/1936 | Ives | |
| 2,063,985 A | 12/1936 | Coffey | |
| 2,279,825 A | 4/1942 | Kaszab | |
| 2,326,634 A | 8/1943 | Gebhard et al. | |
| 2,500,511 A | 3/1950 | Bonnet | |
| 2,622,472 A | 12/1952 | Bonnet | |
| 2,833,176 A | 5/1958 | Ossoinak | |
| 3,154,872 A | 11/1964 | Nordgren | |

(Continued)

FOREIGN PATENT DOCUMENTS

DE        198 04 997 C1    2/1999

(Continued)

OTHER PUBLICATIONS

Kim et al., "Polyurethanes having shape memory effects", *Polymer*, vol. 37 No. 26, pp. 5781-5793, 1996.

(Continued)

*Primary Examiner*—David N. Spector
(74) *Attorney, Agent, or Firm*—Melissa E. Buss

(57) ABSTRACT

Translucent, transparent, or semi-translucent microlens sheetings with composite images are disclosed, in which a composite image floats above or below the sheeting, or both. The composite image may be two-dimensional or three-dimensional. The sheeting may have at least one layer of material having a surface of microlenses that form one or more images at positions internal to the layer of material, at least one of the images being a partially complete image. Additional layers, such as retroreflective, translucent, transparent, or optical structure layers may also be incorporated into the sheeting.

20 Claims, 13 Drawing Sheets

U.S. PATENT DOCUMENTS

| | | |
|---|---|---|
| 3,161,509 A | 12/1964 | Howe et al. |
| 3,306,974 A | 2/1967 | Cunnally |
| 3,357,770 A | 12/1967 | Clay |
| 3,365,350 A | 1/1968 | Cahn |
| 3,442,569 A | 5/1969 | Bonnet |
| 3,459,111 A | 8/1969 | Cooper, Jr. |
| 3,503,315 A | 3/1970 | Montebello |
| 3,584,369 A | 6/1971 | Montebello |
| 3,607,273 A | 9/1971 | Kinney |
| 3,613,539 A | 10/1971 | Dudley |
| 3,676,130 A | 7/1972 | Burckhardt et al. |
| 3,706,486 A | 12/1972 | de Montebello |
| 3,751,258 A | 8/1973 | Howe et al. |
| 3,801,183 A | 4/1974 | Sevelin et al. |
| 4,034,555 A | 7/1977 | Rosenthal |
| 4,082,426 A | 4/1978 | Brown |
| 4,099,838 A | 7/1978 | Cook et al. |
| 4,121,011 A | 10/1978 | Glover et al. |
| 4,200,875 A | 4/1980 | Galanos |
| 4,315,665 A | 2/1982 | Haines |
| 4,424,990 A | 1/1984 | White et al. |
| 4,541,727 A | 9/1985 | Rosenthal |
| 4,541,830 A | 9/1985 | Hotta et al. |
| 4,552,442 A | 11/1985 | Street |
| 4,557,590 A | 12/1985 | Winnek |
| 4,618,552 A | 10/1986 | Tanaka et al. |
| 4,629,667 A | 12/1986 | Kistner et al. |
| 4,632,895 A | 12/1986 | Patel et al. |
| 4,634,220 A | 1/1987 | Hockert et al. |
| 4,650,283 A | 3/1987 | Orensteen et al. |
| 4,668,063 A | 5/1987 | Street |
| 4,688,894 A | 8/1987 | Hockert |
| 4,691,993 A | 9/1987 | Porter et al. |
| 4,700,207 A | 10/1987 | Vanier et al. |
| 4,708,920 A | 11/1987 | Orensteen et al. |
| 4,714,656 A | 12/1987 | Bradshaw et al. |
| 4,732,453 A | 3/1988 | de Montebello et al. |
| 4,743,526 A | 5/1988 | Ando et al. |
| 4,757,350 A | 7/1988 | Street |
| 4,772,582 A | 9/1988 | DeBoer |
| 4,775,219 A | 10/1988 | Appeldorn et al. |
| 4,799,739 A | 1/1989 | Newswanger |
| 4,833,124 A | 5/1989 | Lum |
| 4,876,235 A | 10/1989 | DeBoer |
| 4,927,238 A | 5/1990 | Green et al. |
| 4,935,335 A | 6/1990 | Fotland |
| 5,064,272 A | 11/1991 | Bailey et al. |
| 5,091,483 A | 2/1992 | Mazurek et al. |
| 5,105,206 A | 4/1992 | Sarraf et al. |
| 5,169,707 A | 12/1992 | Faykish et al. |
| 5,244,288 A | 9/1993 | Nagaoka et al. |
| 5,254,390 A | 10/1993 | Lu |
| 5,264,278 A | 11/1993 | Mazurek et al. |
| 5,279,912 A | 1/1994 | Telfer et al. |
| 5,308,737 A | 5/1994 | Bills et al. |
| 5,326,619 A | 7/1994 | Dower et al. |
| 5,330,799 A | 7/1994 | Sandor et al. |
| 5,359,454 A | 10/1994 | Steenblik et al. |
| 5,360,694 A | 11/1994 | Thien et al. |
| 5,364,740 A | 11/1994 | Fohrenkamm et al. |
| 5,449,597 A | 9/1995 | Sawyer |
| 5,455,689 A | 10/1995 | Taylor et al. |
| 5,459,016 A | 10/1995 | Debe et al. |
| 5,491,045 A | 2/1996 | DeBoer et al. |
| 5,521,035 A | 5/1996 | Wolk et al. |
| 5,554,432 A | 9/1996 | Sandor et al. |
| 5,589,246 A | 12/1996 | Calhoun et al. |
| 5,594,841 A | 1/1997 | Schutz |
| 5,639,580 A | 6/1997 | Morton |
| 5,642,226 A | 6/1997 | Rosenthal |
| 5,644,431 A | 7/1997 | Magee |
| 5,671,089 A | 9/1997 | Allio |
| 5,680,171 A | 10/1997 | Lo et al. |
| 5,681,676 A | 10/1997 | Telfer et al. |
| 5,685,939 A | 11/1997 | Wolk et al. |
| 5,689,372 A | 11/1997 | Morton |
| 5,706,133 A | 1/1998 | Orensteen et al. |
| 5,712,731 A | 1/1998 | Drinkwater et al. |
| 5,717,844 A | 2/1998 | Lo et al. |
| 5,744,291 A | 4/1998 | Ip |
| 5,757,550 A | 5/1998 | Gulick, Jr. |
| 5,843,617 A | 12/1998 | Patel et al. |
| 5,850,278 A | 12/1998 | Lo et al. |
| 5,850,580 A | 12/1998 | Taguchi et al. |
| 5,856,061 A | 1/1999 | Patel et al. |
| 5,889,118 A | 3/1999 | Delgado et al. |
| 5,894,069 A | 4/1999 | Wen et al. |
| 5,896,230 A | 4/1999 | Goggins |
| 5,935,758 A | 8/1999 | Patel et al. |
| 5,945,249 A | 8/1999 | Patel et al. |
| 5,994,026 A | 11/1999 | DeBoer et al. |
| 6,057,067 A | 5/2000 | Isberg et al. |
| 6,084,713 A | 7/2000 | Rosenthal |
| 6,092,465 A | 7/2000 | Agronin |
| 6,110,645 A | 8/2000 | DeBoer et al. |
| 6,197,474 B1 | 3/2001 | Niemeyer et al. |
| 6,212,805 B1 * | 4/2001 | Hill ............................ 40/443 |
| 6,228,555 B1 | 5/2001 | Hoffend, Jr. et al. |
| 6,286,873 B1 * | 9/2001 | Seder ......................... 283/117 |
| 6,288,842 B1 | 9/2001 | Florczak et al. |
| 6,468,715 B2 | 10/2002 | Hoffend, Jr. et al. |
| 7,068,434 B2 | 6/2006 | Florczak et al. |

FOREIGN PATENT DOCUMENTS

| | | |
|---|---|---|
| EP | 0 175 504 | 3/1986 |
| EP | 0 363 919 | 1/1990 |
| EP | 0 583 766 | 2/1994 |
| EP | 0 658 443 | 6/1995 |
| EP | 0 673 785 | 9/1995 |
| EP | 0 688 351 | 8/1997 |
| EP | 0 655 347 | 9/1997 |
| EP | 0 615 860 | 8/1998 |
| EP | 1 079 274 | 2/2001 |
| GB | 1 308 116 | 2/1973 |
| GB | 1 433 025 | 4/1976 |
| GB | 2 083 726 | 3/1982 |
| JP | 1-181083 | 12/1989 |
| JP | 4309583 | 11/1992 |
| JP | 6-308895 | 11/1994 |
| JP | 7-140571 | 6/1995 |
| JP | 7-281327 | 10/1995 |
| JP | 10-186276 | 7/1998 |
| JP | 11-500236 | 1/1999 |
| WO | WO 83/03019 | 9/1983 |
| WO | WO 95/26281 | 10/1995 |
| WO | WO 96/24867 | 8/1996 |
| WO | WO 97/15173 | 4/1997 |
| WO | WO 97/46631 | 12/1997 |
| WO | WO 99/37949 | 7/1999 |

OTHER PUBLICATIONS

Lendlein et al., "AB-polymer networks based on oligo(ε-caprolactone) segments showing shape-memory properties", *PNAS*, vol. 98 No. 3, pp. 842-847, 2001.

Lendlein and Kelch, "Shape-memory polymers", *Angew. Chem. Int. Ed.* 2002, 41, 2034-2057.

Lendlein and Langer, "Biodegradable, elastic shape-memory polymers for potential biomedical applications", *Science*, vol. 296, pp. 1673-1676, 2002.

Mazurek et al., "Novel materials based on silicone-acrylate copolymer networks", *Journal of Applied Polymer Science*, vol. 80, pp. 159-180, 2001.

Factiva WireWatch Message, "Shape-memory polymers offer new twist on applications", *Modern Plastics International, Chemical Business NewsBase*, Apr. 24, 2003.

U.S. Appl. No. 11/248950, entitled "Methods Of Forming Sheeting With A Composite Image That Floats And Sheeting With A Composite Image That Floats", filed Oct. 11, 2005.

U.S. Appl. No. 11/495999, entitled "Microlens Sheeting With Floating Image Using A Shape Memory Material", filed Jul. 28, 2006.

U.S. Appl. No. 11/460685, entitled "Shape Memory Polymer Articles With A Microstructured Surface", filed Jul. 28, 2006.

U.S. Appl. No. 11/460682, entitled "Method For Changing The Shape Of A Surface Of A Shape Memory Polymer Article", filed Jul. 28, 2006.

DeMontebello, "Processing and Display of Three-Dimensional Data II", Proceedings of SPIE, vol. 507, San Diego, 1984.

Weekly Reports of the Meetings of the Academy of Science published, in accordance with an academy decision dated Jul. 13, 1835, vol. 146, Jan.-Jun. 1908, pp. 446-451.

3M Security Systems Division, 3M™ Full Page Reader Product Fact Sheet, 2004, 6 pages.

3M Security Systems Division, 3M™ ePassport Reader Product Fact Sheet, 2004, 6 pages.

3M Security Systems Division, 3M™ Inspection Reader Product Fact Sheet, 2004, 2 pages.

3M Security Systems Division, 3M™ Authentication Reader Product Fact Sheet, 2004, 4 pages.

Y.A. Dudnikov and B.K. Rozhkov, "Raster systems for producing of three-dimensional images", Leningrad, Maschinostroeniye, 1986, pp. 119-123.

\* cited by examiner

SHEETING WITH COMPOSITE IMAGE THAT FLOATS

This application is a continuation-in-part of U.S. application Ser. No. 09/898,580, filed Jul. 3, 2001, now U.S. Pat. No. 7,068,434, which is a continuation-in-part of U.S. application Ser. No. 09/510,428, filed Feb. 22, 2000, now U.S. Pat. No. 6,288,842, the entire content of both applications are hereby incorporated herein by reference.

FIELD OF THE INVENTION

The present invention relates to sheeting that provides one or more composite images that are perceived by an observer to be suspended in space relative to the sheeting, and in which the perspective of the composite image changes with the viewing angle.

BACKGROUND OF THE INVENTION

Sheeting materials having a graphic image or other mark have been widely used, particularly as labels for authenticating an article or document. For example, sheetings such as those described in U.S. Pat. Nos. 3,154,872; 3,801,183; 4,082,426; and 4,099,838 have been used as validation stickers for vehicle license plates, and as security films for driver's licenses, government documents, tape cassettes, playing cards, beverage containers, and the like. Other uses include graphics applications for identification purposes such as on police, fire or other emergency vehicles, in advertising and promotional displays and as distinctive labels to provide brand enhancement.

Another form of imaged sheeting is disclosed in U.S. Pat. No. 4,200,875 (Galanos). Galanos discloses the use of a particularly "high-gain retroreflective sheeting of the exposed-lens type," in which images are formed by laser irradiation of the sheeting through a mask or pattern. That sheeting comprises a plurality of transparent glass microspheres partially embedded in a binder layer and partially exposed above the binder layer, with a metal reflective layer coated on the embedded surface of each of the plurality of microspheres. The binder layer contains carbon black, which is said to minimize any stray light that impinges on the sheeting while it is being imaged. The energy of the laser beam is further concentrated by the focusing effect of the microlenses embedded in the binder layer.

The images formed in the retroreflective sheeting of Galanos can be viewed if, and only if, the sheeting is viewed from the same angle at which the laser irradiation was directed at the sheeting. That means, in different terms, that the image is only viewable over a very limited observation angle. For that and other reasons, there has been a desire to improve certain properties of such a sheeting.

As early as 1908, Gabriel Lippman invented a method for producing a true three-dimensional image of a scene in lenticular media having one or more photosensitive layers. That process, known as integral photography, is also described in De Montebello, "Processing and Display of Three-Dimensional Data II" in Proceedings of SPIE, San Diego, 1984. In Lippman's method, a photographic plate is exposed through an array of lenses (or "lenslets"), so that each lenslet of the array transmits a miniature image of the scene being reproduced, as seen from the perspective of the point of the sheet occupied by that lenslet, to the photosensitive layers on a photographic plate. After the photographic plate has been developed, an observer looking at the composite image on the plate through the lenslet array sees a three-dimensional representation of the scene photographed. The image may be in black and white or in color, depending on the photosensitive materials used.

Because the image formed by the lenslets during exposure of the plate has undergone only a single inversion of each miniature image, the three-dimensional representation produced is pseudoscopic. That is, the perceived depth of the image is inverted so that the object appears "inside out." This is a major disadvantage, because to correct the image it is necessary to achieve two optical inversions. These methods are complex, involving multiple exposures with a single camera, or multiple cameras, or multi-lens cameras, to record a plurality of views of the same object, and require extremely accurate registration of multiple images to provide a single three-dimensional image. Further, any method that relies on a conventional camera requires the presence of a real object before the camera. This further renders that method ill-adapted for producing three-dimensional images of a virtual object (meaning an object that exists in effect, but not in fact). A further disadvantage of integral photography is that the composite image must be illuminated from the viewing side to form a real image that may be viewed.

SUMMARY OF THE INVENTION

The present invention provides a microlens sheeting having a composite image that appears to be suspended above or below the sheeting. These suspended images are referred to for convenience as floating images, and they can be located above or below the sheeting (either as two or three-dimensional images), or can be a three-dimensional image that appears above, in the plane of, and below the sheeting. The images can be in black and white or in color, and can appear to move with the observer. The floating images can be observed by a viewer with the unaided eye.

The floating images of the microlens sheeting may be formed within a layer of microlensed material, without requiring an adjacent layer of material. The shape of the microlenses and the thickness of the layer of material on which the microlenses are formed are selected such that collimated light incident to the array is focused at regions within the layer of the sheeting. The energy of the incident light impinging upon the microlens sheeting is focused by the individual microlenses to regions within the sheeting. This focused energy modifies the layer to provide an image, the size, shape, and appearance of which depends on the interaction between the light rays and the microlenses. For example, light rays may form images associated with each of the microlenses within the layer at a damaged portion as a result of photodegradation, charring, or other damage to the sheeting.

The inventive sheeting having a composite image as described may be used in a variety of applications such as securing tamperproof images in security documents, passports, identification cards, financial transaction cards (e.g. credit cards), license plates, or other articles.

In one embodiment, a sheeting comprises a layer of material having a surface of microlenses that form one or more images at positions internal to the layer of material, wherein at least one of the images is a partially complete image, and each of the images is associated with a different one of the microlenses, and wherein the microlenses have refractive surfaces that transmit light to positions within the layer of material to produce a composite image from the images formed within the layer of material so that the composite image appears to float above the sheeting, float below the sheeting or float in the plane of the sheeting.

In another embodiment, a sheeting comprises a single layer of material having microlenses formed on a first side and a retroreflective portion formed on a second side opposite the microlenses, wherein the layer of material includes one or more images formed between the microlenses and the retroreflective portion, and wherein the microlenses produce a composite image that appears to float above the sheeting, float below the sheeting or float in the plane of the sheeting.

In a further embodiment, a sheeting comprises a layer of material having a surface of microlenses, a retroreflective layer; and a radiation-sensitive layer disposed between the layer of material and the retroreflective layer, wherein the radiation-sensitive layer includes one or more images formed between the layer of material and the retroreflective portion, and wherein the microlenses produce, from the images of the radiation-sensitive layer, a composite image that appears to float above the sheeting, float below the sheeting or float in the plane of the sheeting.

In yet another embodiment, a sheeting having first and second sides comprises a first layer of material having a surface of microlenses, and a second layer of material having a surface of microlenses disposed proximate to the first layer, wherein one or more images are formed within the sheeting at locations between the microlenses of the first layer and the microlenses of the second layer, wherein at least one of the images is a partially complete image, wherein each image is associated with one of a plurality of microlenses of the first layer, and wherein the microlenses have refractive surfaces that transmit light to positions within the sheeting to produce a composite image from the images that appears to float above the sheeting, float below the sheeting, or float in the plane of the sheeting, and wherein the microlenses of the first layer and the microlenses of the second layer are aligned such that the composite image can be viewed from both the first side and the second side of the sheeting.

In yet another embodiment, a sheeting comprises a single layer having a first set of microlenses formed on a first side and a second set of microlenses formed on a second side opposite the first set of microlenses, wherein the single layer includes one or more images formed internally to the single layer, and wherein, from the images, the first set of microlenses and the second set of microlenses produce a composite image that can be viewed from both the first side and the second side of the sheeting.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The invention will be described herein with reference to the appended drawings, in which.

DESCRIPTION OF THE PREFERRED EMBODIMENT(S)

The microlens sheeting of the present invention provides a composite image, provided by individual images associated with a number of the microlenses, that appears to be suspended, or to float, above, in the plane of, and/or below the sheeting.

To provide a complete description of the invention, microlens sheetings will be described in Part I below, followed by descriptions of the material layers (preferably radiation sensitive material layers) of such sheetings in Part II, radiation sources in Part III, and the imaging process in Part IV. Several examples are also provided to further explain various embodiments of the present invention.

I. Microlens Sheeting

Figure 1:
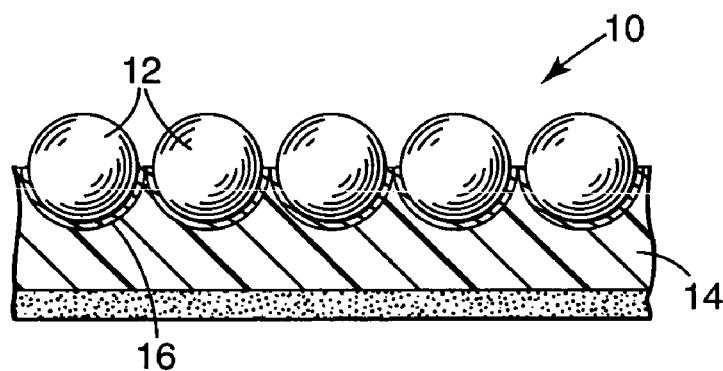
FIG. 1 is an enlarged cross sectional view of an "exposed lens" microlens sheeting.

Microlens sheeting in which the images of this invention can be formed comprise one or more discrete layers of microlenses with a layer of material (preferably a radiation-sensitive material or coating, as described below) disposed adjacent to one side of the microlens layer or layers. For example, FIG. 1 shows an "exposed lens" type of microlens sheeting 10 that includes a monolayer of transparent microspheres 12 that are partially embedded in a binder layer 14, which is typically a polymeric material. The microspheres are transparent both to the wavelengths of radiation that may be used to image the layer of material, as well as to the wavelengths of light in which the composite image will be viewed. The layer of material 16 is disposed at the rear surface of each microsphere, and in the illustrated embodiment typically contacts only a portion of the surface of each of the microspheres 12. This type of sheeting is described in greater detail in U.S. Pat. No. 2,326,634 and is presently available from 3M under the designation Scotchlite 8910 series reflective fabric.

Figure 2:
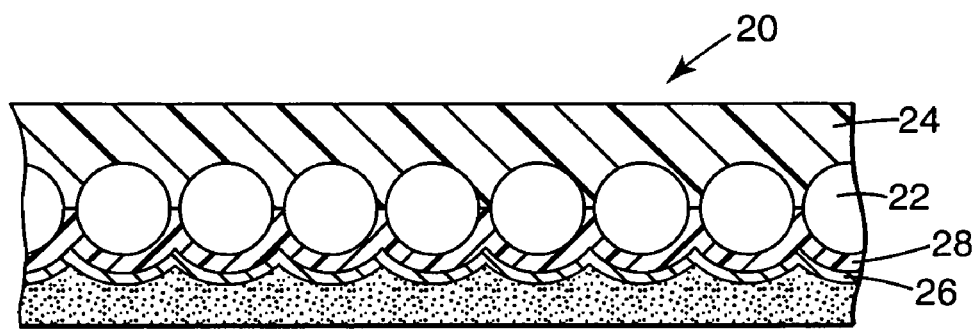
FIG. 2 is an enlarged cross sectional view of an "embedded lens" microlens sheeting.

FIG. 2 shows another suitable type of microlens sheeting. This microlens sheeting 20 is an "embedded-lens" type of sheeting in which the microsphere lenses 22 are embedded in a transparent protective overcoat 24, which is typically a polymeric material. The layer of material 26 is disposed behind the microspheres at the back of a transparent spacer layer 28, which is also typically a polymeric material. This type of sheeting is described in greater detail in U.S. Pat. No. 3,801,183, and is presently available from 3M under the designation Scotchlite 3290 series Engineer grade retroreflective sheeting. Another suitable type of microlens sheeting is referred to as encapsulated lens sheeting, an example of which is described in U.S. Pat. No. 5,064,272, and presently is available from 3M under the designation Scotchlite 3870 series High Intensity grade retroreflective sheeting.

Figure 3:
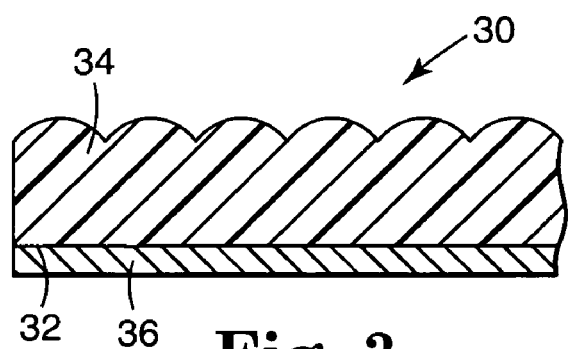
FIG. 3 is an enlarged cross sectional view of a microlens sheeting comprising a plano-convex base sheet.

FIG. 3 shows yet another suitable type of microlens sheeting. This sheeting comprises a transparent plano-convex or aspheric base sheet 30 having first and second broad faces, the second face 32 being substantially planer and the first face having an array of substantially hemi-spheroidal or hemi-aspheroidal microlenses 34. The shape of the microlenses and thickness of the base sheet are selected such that collimated light incident to the array is focused approximately at the second face. The layer of material 36 is provided on the second face. Sheeting of this kind is described in, for example, U.S. Pat. No. 5,254,390, and is presently available from 3M under the designation 2600 series 3M Secure Card receptor.

The microlenses of the sheeting preferably have an image forming refractive surface in order for image formation to occur; generally this is provided by a curved microlens surface. For curved surfaces, the microlens will preferably have a uniform index of refraction. Other useful materials that provide a gradient refractive index (GRIN) will not necessarily need a curved surface to refract light. The microlens surfaces are preferably spherical in nature, but aspherical surfaces are also acceptable. The microlenses may have any symmetry, such as cylindrical or spherical, provided real images are formed by the refraction surfaces. The microlenses themselves can be of discrete form, such as round plano-convex lenslets, round double convex lenslets, rods, microspheres, beads, or cylindrical lenslets. Materials from which the microlenses can be formed include glass, polymers, minerals, crystals, semiconductors and combinations of these and other materials. Non-discrete microlens elements may also be used. Thus, microlenses formed from a replication or embossing process (where the surface of the sheeting is altered in shape to produce a repetitive profile with imaging characteristics) can also be used.

Microlenses with a uniform refractive index of between 1.5 and 3.0 over the visible and infrared wavelengths are most useful. Suitable microlens materials will have minimal absorption of visible light, and in embodiments in which an energy source is used to image a radiation-sensitive layer the materials should exhibit minimal absorption of the energy source as well. The refractive power of the microlens, whether the microlens is discrete or replicated, and regardless of the material from which the microlenses are made, is preferably such that the light incident upon the refracting surface will refract and focus on the opposite side of the microlens. More specifically, the light will be focused either on the back surface of the microlens or on the material adjacent to the microlens. In embodiments in which the material layer is radiation sensitive, the microlenses preferably form a demagnified real image at the appropriate position on that layer. Demagnification of the image by approximately 100 to 800 times is particularly useful for forming images that have good resolution. The construction of the microlens sheeting to provide the necessary focusing conditions so that energy incident upon the front surface of the microlens sheeting is focused upon a material layer that is preferably radiation sensitive is described in the U.S. patents referenced earlier in this section.

Microspheres with diameters ranging from 15 micrometers to 275 micrometers are preferable, though other sized microspheres may be used. Good composite image resolution can be obtained by using microspheres having diameters in the smaller end of the aforementioned range for composite images that are to appear to be spaced apart from the microsphere layer by a relatively short distance, and by using larger microspheres for composite images that are to appear to be spaced apart from the microsphere layer by larger distances. Other microlens, such as plano-convex, cylindrical, spherical or aspherical microlenses having lenslet dimensions comparable to those indicated for the microspheres, can be expected to produce similar optical results.

II. Layer of Material

As noted above, a layer of material is provided adjacent to the microlenses. The layer of material may be highly reflective as in some of the microlens sheetings described above, or it may have low reflectivity. When the material is highly reflective, the sheeting may have the property of retroreflectivity as described in U.S. Pat. No. 2,326,634. Individual images formed in the material associated with a plurality of microlenses, when viewed by an observer under reflected or transmitted light, provide a composite image that appears to be suspended, or float, above, in the plane of, and/or below the sheeting. Although other methods may be used, the preferred method for providing such images is to provide a radiation sensitive material as the material layer, and to use radiation to alter that material in a desired manner to provide the image. Thus, although the invention is not limited thereby, the remaining discussion of the layer of material adjacent the microlenses will be provided largely in the context of a radiation sensitive material layer.

Radiation sensitive materials useful for this invention include coatings and films of metallic, polymeric and semiconducting materials as well as mixtures of these. As used in reference to the present invention, a material is "radiation sensitive" if upon exposure to a given level of visible or other radiation the appearance of the material exposed changes to provide a contrast with material that was not exposed to that radiation. The image created thereby could thus be the result of a compositional change, a removal or ablation of the material, a phase change, or a polymerization of the radiation sensitive coating. Examples of some radiation sensitive metallic film materials include aluminum, silver, copper, gold, titanium, zinc, tin, chromium, vanadium, tantalum, and alloys of these metals. These metals typically provide a contrast due to the difference between the native color of the metal and a modified color of the metal after exposure to the radiation. The image, as noted above, may also be provided by ablation, or by the radiation heating the material until an image is provided by optical modification of the material. U.S. Pat. No. 4,743,526, for example, describes heating a metal alloy to provide a color change.

In addition to metallic alloys, metallic oxides and metallic suboxides can be used as a radiation sensitive medium. Materials in this class include oxide compounds formed from aluminum, iron, copper, tin and chromium. Non-metallic materials such as zinc sulfide, zinc selenide, silicon dioxide, indium tin oxide, zinc oxide, magnesium fluoride and silicon can also provide a color or contrast that is useful for this invention.

Multiple layers of thin film materials can also be used to provide unique radiation sensitive materials. These multi-layer materials can be configured to provide a contrast change by the appearance or removal of a color or contrast agent. Exemplary constructions include optical stacks or tuned cavities that are designed to be imaged (by a change in color, for example) by specific wavelengths of radiation. One specific example is described in U.S. Pat. No. 3,801,183, which discloses the use of cryolite/zinc sulphide ($Na_3AlF_6$/ZnS) as a dielectric mirror. Another example is an optical stack composed of chromium/polymer (such as plasma polymerized butadiene)/silicon dioxide/aluminum where the thickness of the layers are in the ranges of 4 nm for chromium, between 20 nm and 60 nm for the polymer, between 20 nm and 60 nm for the silicon dioxide, and between 80 nm and 100 nm for the aluminum, and where the individual layer thicknesses are selected to provide specific color reflectivity in the visible spectrum. Thin film tuned cavities could be used with any of the single layer thin films previously discussed. For example, a tuned cavity with an approximately 4 nm thick layer of chromium and the silicon dioxide layer of between about 100 nm and 300 nm, with the thickness of the silicon dioxide layer being adjusted to provide a colored imaged in response to specific wavelengths of radiation.

Radiation sensitive materials useful for this invention also include thermochromic materials. "Thermochromic" describes a material that changes color when exposed to a change in temperature. Examples of thermochromic materials useful in this invention are described in U.S. Pat. No. 4,424,990, and include copper carbonate, copper nitrate with thiourea, and copper carbonate with sulfur containing compounds such as thiols, thioethers, sulfoxides, and sulfones. Examples of other suitable thermochromic compounds are described in U.S. Pat. No. 4,121,011, including hydrated sulfates and nitrides of boron, aluminum, and bismuth, and the oxides and hydrated oxides of boron, iron, and phosphorus.

Naturally, if the material layer is not going to be imaged using a source of radiation, then the material layer can, but is not required to, be radiation sensitive. Radiation sensitive materials are preferred for ease of manufacturing, however, and thus a suitable radiation source is preferably also used.

III. Radiation Sources

As noted above, a preferred manner of providing the image patterns on the layer of material adjacent the microlenses is to use a radiation source to image a radiation sensitive material. Any energy source providing radiation of the desired intensity and wavelength can be used with the method of the present invention. Devices capable of providing radiation having a wavelength of between 200 nm and 11 micrometers are believed to be particularly preferred. Examples of high peak power radiation sources useful for this invention include excimer flashlamps, passively Q-switched microchip lasers, and Q-switched Neodymium doped-yttrium aluminum garnet (abbreviated Nd:YAG), Neodymium doped-yttrium lithium fluoride (abbreviated Nd:YLF) and Titanium doped-sapphire (abbreviated Ti:sapphire) lasers. These high peak power sources are most useful with radiation sensitive materials that form images through ablation—the removal of material or in multiphoton absorption processes. Other examples of useful radiation sources include devices that give low peak power such as laser diodes, ion lasers, non Q-switched solid state lasers, metal vapor lasers, gas lasers, arc lamps and high power incandescent light sources. These sources are particularly useful when the radiation sensitive medium is imaged by a non-ablative method.

Figure 14:
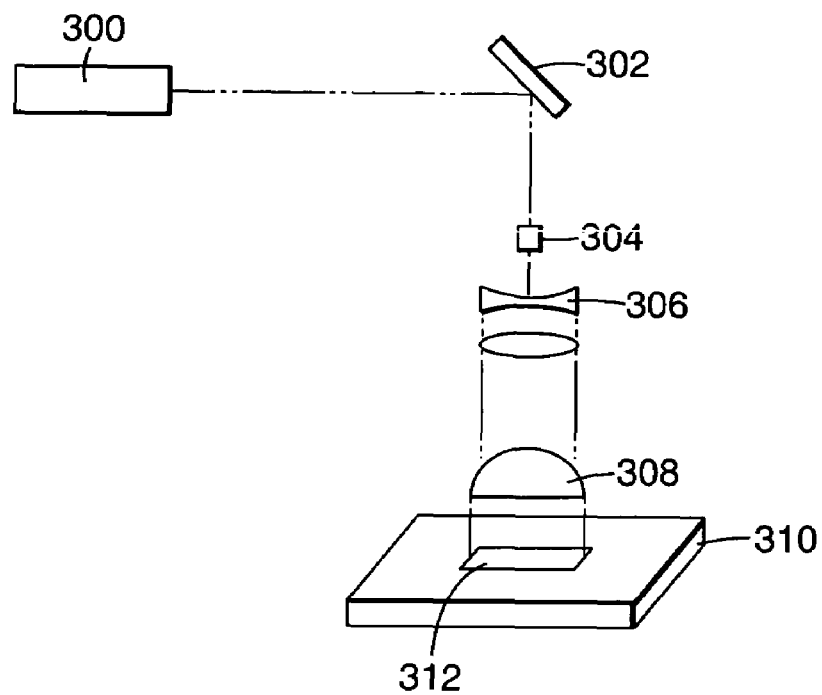
FIG. 14 is a depiction of an optical train for creating the divergent energy used to form the composite images of this invention.
Figure 15:
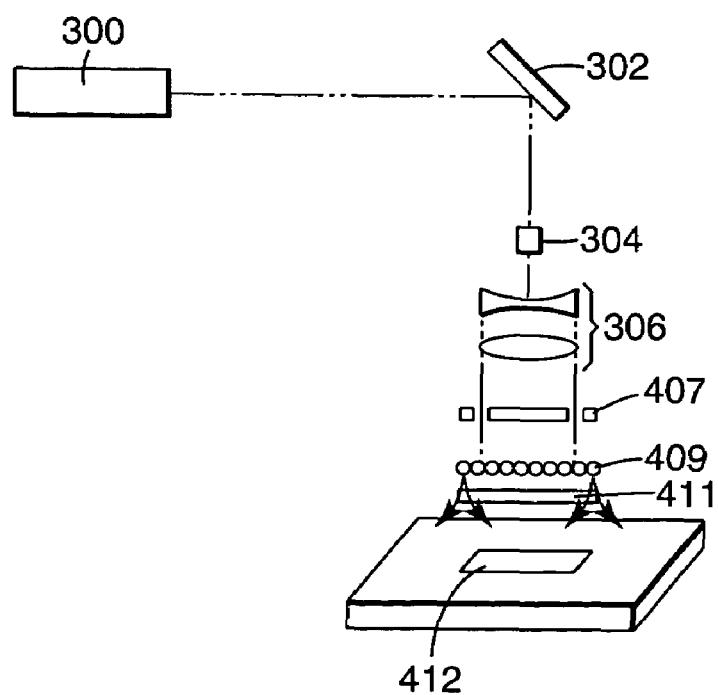
FIG. 15 is a depiction of a second optical train for creating the divergent energy used to form the composite images of this invention.
Figure 16:
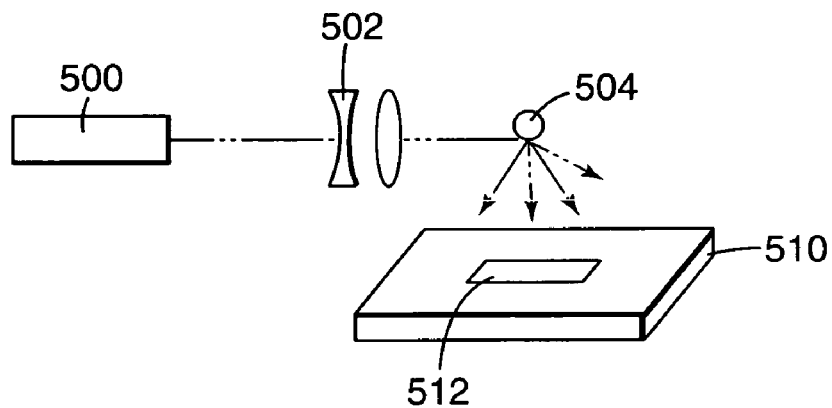
FIG. 16 is a depiction of a third optical train for creating the divergent energy used to form the composite images of this invention.

For all useful radiation sources, the energy from the radiation source is directed toward the microlens sheeting material and controlled to give a highly divergent beam of energy. For energy sources in the ultraviolet, visible, and infrared portions of the electromagnetic spectrum, the light is controlled by appropriate optical elements, examples of which are shown in FIGS. 14, 15, and 16 and described in greater detail below. In one embodiment, a requirement of this arrangement of optical elements, commonly referred to as an optical train, is that the optical train direct light toward the sheeting material with appropriate divergence or spread so as to irradiate the microlens and thus the material layer at the desired angles. The composite images of the present invention are preferably obtained by using light spreading devices with numerical apertures (defined as the sine of the half angle of the maximum diverging rays) of greater than or equal to 0.3. Light spreading devices with larger numerical apertures produce composite images having a greater viewing angle, and a greater range of apparent movement of the image.

IV. Imaging Process

An examplary imaging process according to this invention consists of directing collimated light from a laser through a lens toward the microlens sheeting. To create a sheeting having a floating image, as described further below, the light is transmitted through a diverging lens with a high numerical aperture (NA) to produce a cone of highly divergent light. A high NA lens is a lens with a NA equal to or greater than 0.3. The radiation sensitive coating side of the microspheres is positioned away from the lens, so that the axis of the cone of light (the optical axis) is perpendicular to the plane of the microlens sheeting.

Because each individual microlens occupies a unique position relative to the optical axis, the light impinging on each microlens will have a unique angle of incidence relative to the light incident on each other microlens. Thus, the light will be transmitted by each microlens to a unique position on the material layer, and produce a unique image. More precisely, a single light pulse produces only a single imaged dot on the material layer, so to provide an image adjacent each microlens, multiple pulses of light are used to create that image out of multiple imaged dots. For each pulse, the optical axis is located at a new position relative to the position of the optical axis during the previous pulse. These successive changes in the position of the optical axis relative to the microlenses results in a corresponding change in the angle of incidence upon each microlens, and accordingly in the position of the imaged dot created in the material layer by that pulse. As a result, the incident light focusing on the backside of the microsphere images a selected pattern in the radiation sensitive layer. Because the position of each microsphere is unique relative to every optical axis, the image formed in the radiation sensitive material for each microsphere will be different from the image associated with every other microsphere.

Another method for forming floating composite images uses a lens array to produce the highly divergent light to image the microlensed material. The lens array consists of multiple small lenses all with high numerical apertures arranged in a planar geometry. When the array is illuminated by a light source, the array will produce multiple cones of highly divergent light, each individual cone being centered upon its corresponding lens in the array. The physical dimensions of the array are chosen to accommodate the largest lateral size of a composite image. By virtue of the size of the array, the individual cones of energy formed by the lenslets will expose the microlensed material as if an individual lens was positioned sequentially at all points of the array while receiving pulses of light. The selection of which lenses receive the incident light occurs by the use of a reflective mask. This mask will have transparent areas corresponding to sections of the composite image that are to be exposed and reflective areas where the image should not be exposed. Due to the lateral extent of the lens array, it is not necessary to use multiple light pulses to trace out the image.

By having the mask fully illuminated by the incident energy, the portions of the mask that allow energy to pass through will form many individual cones of highly divergent light outlining the floating image as if the image was traced out by a single lens. As a result, only a single light pulse is needed to form the entire composite image in the microlens sheeting. Alternatively, in place of a reflective mask, a beam positioning system, such as a galvometric xy scanner, can be used to locally illuminate the lens array and trace the composite image on the array. Since the energy is spatially localized with this technique, only a few lenslets in the array are illuminated at any given time. Those lenslets that are illuminated will provide the cones of highly diverging light needed to expose the microlensed material to form the composite image in the sheetings.

The lens array itself can be fabricated from discrete lenslets or by an etching process to produce a monolithic array of lenses. Materials suitable for the lenses are those that are non-absorbing at the wavelength of the incident energy. The individual lenses in the array preferably have numerical apertures greater than 0.3 and diameters greater than 30 micrometers but less than 10 mm. These arrays may have antireflection coatings to reduce the effects of back reflections that may cause internal damage to the lens material. In addition, single lenses with an effective negative focal length and dimensions equivalent to the lens array may also be used to increase the divergence of the light leaving the array. Shapes of the individual lenslets in a monolithic array are chosen to have a high numerical aperture and provide a large fill factor of approximately greater than 60%.

Figure 4:
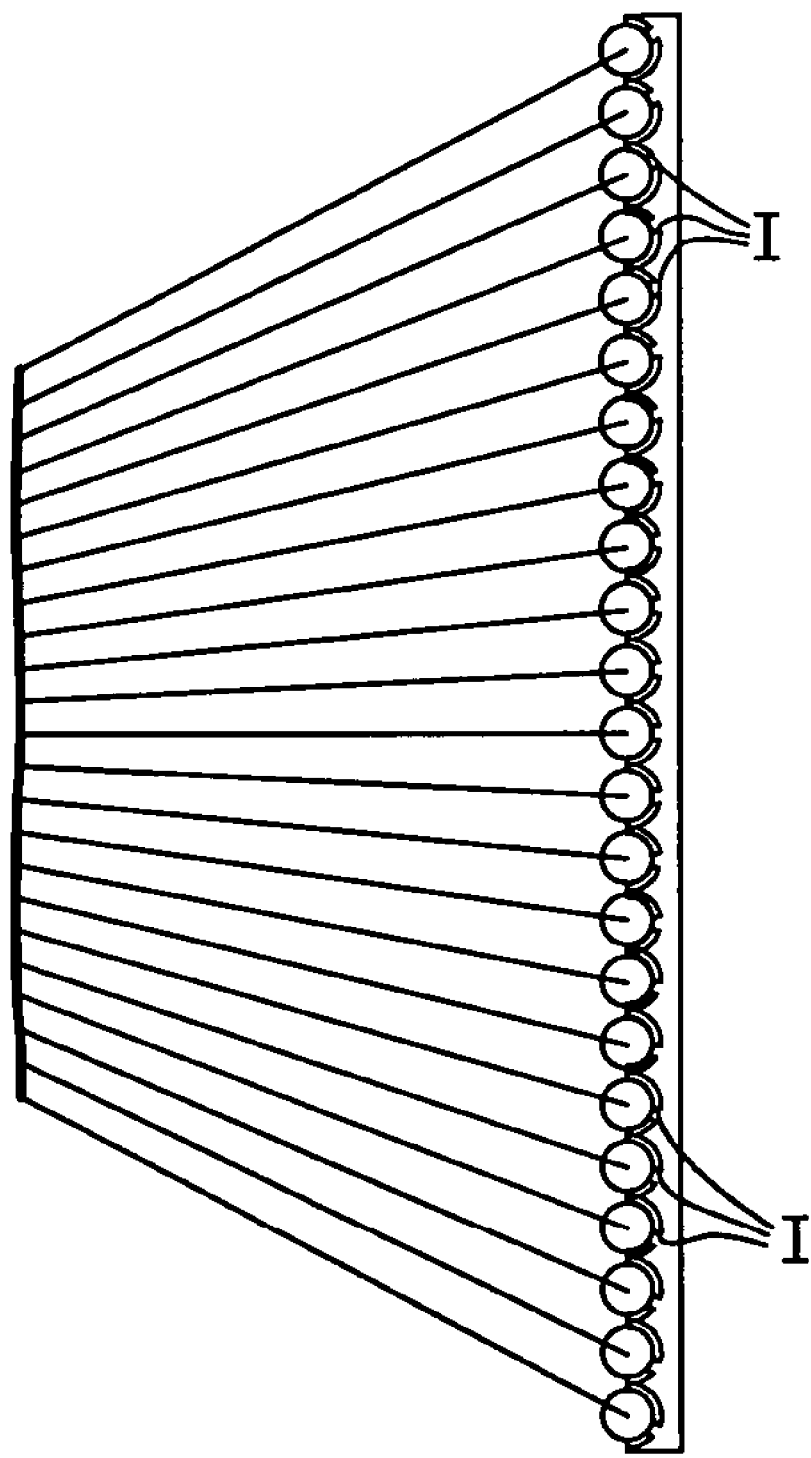
FIG. 4 is a graphical representation of divergent energy impinging on a microlens sheeting constructed of microspheres.

FIG. 4 is a graphical schematic representation of divergent energy impinging on a microlens sheeting. The portion of the material layer on or in which an image I is formed is different for each microlens, because each microlense "sees" the incoming energy from a different perspective. Thus, a unique image is formed in the material layer associated with each microlens.

Figure 5:
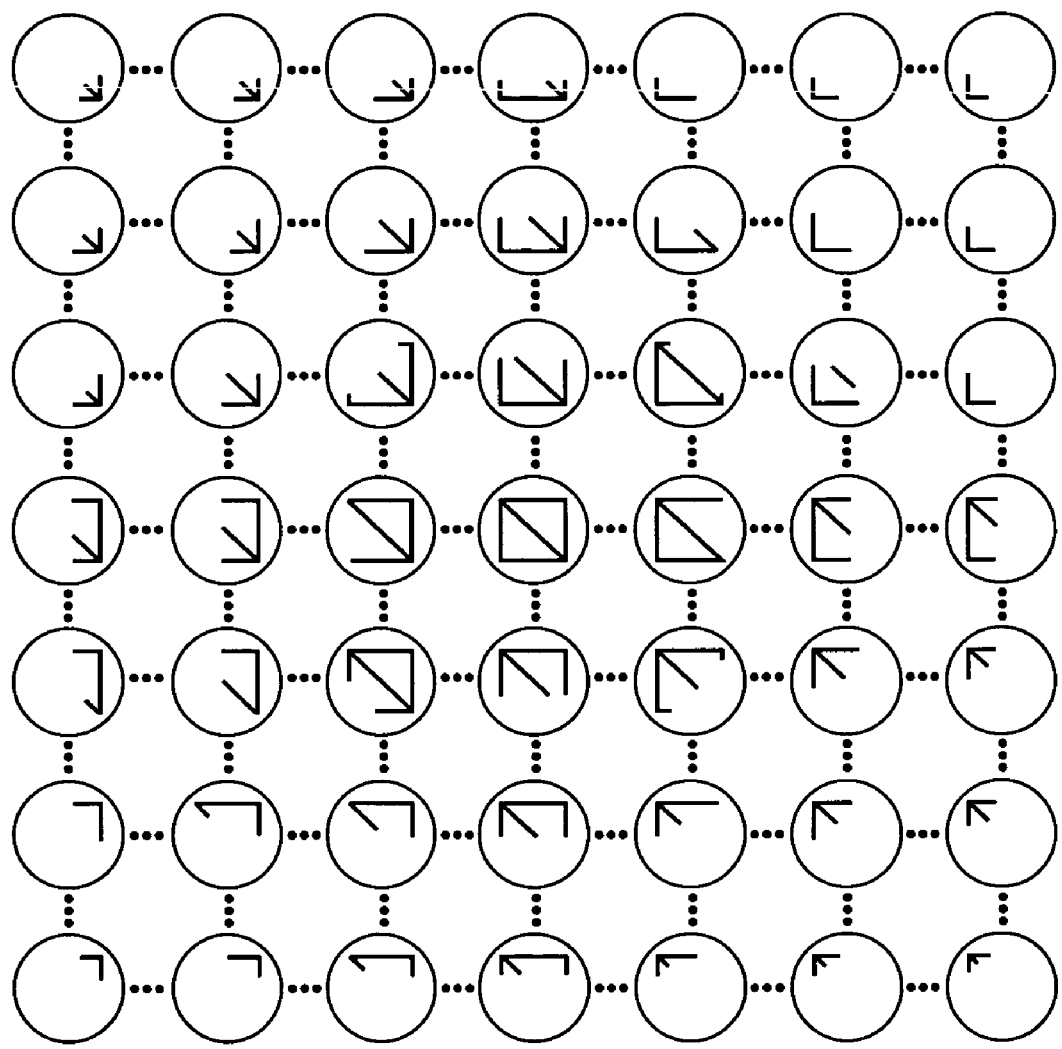
FIG. 5 is a plan view of a section of a microlens sheeting depicting sample images recorded in the material layer adjacent individual microspheres, and further showing that the recorded images range from complete replication to partial replication of the composite image.
Figure 6:
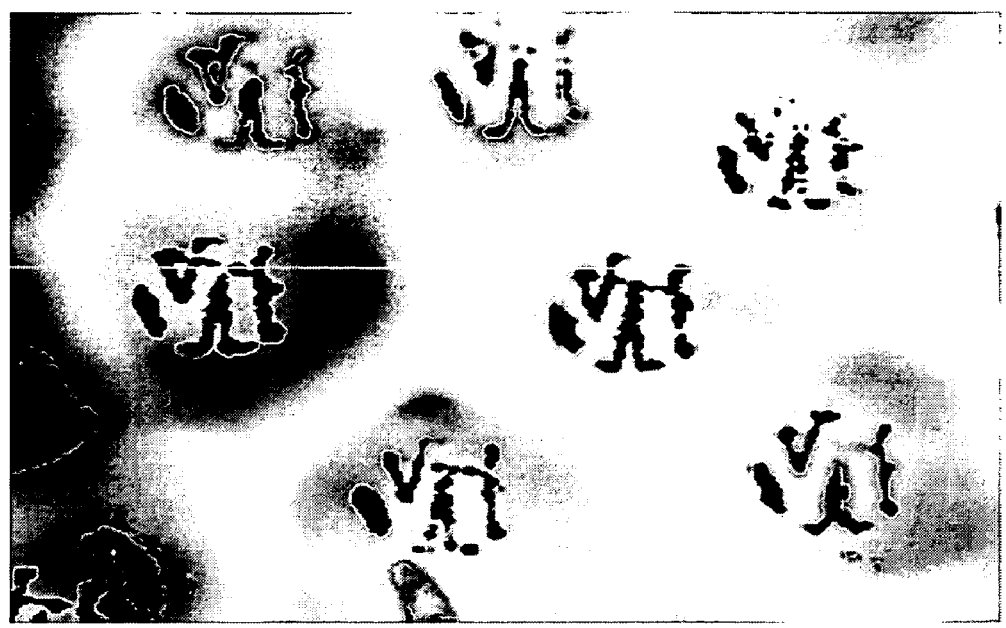
FIG. 6 is an optical micrograph of a microlens sheeting with a radiation sensitive material layer made of aluminum film that has been imaged to provide a composite image that appears to float above the sheeting in accordance with the present invention.
Figure 7:
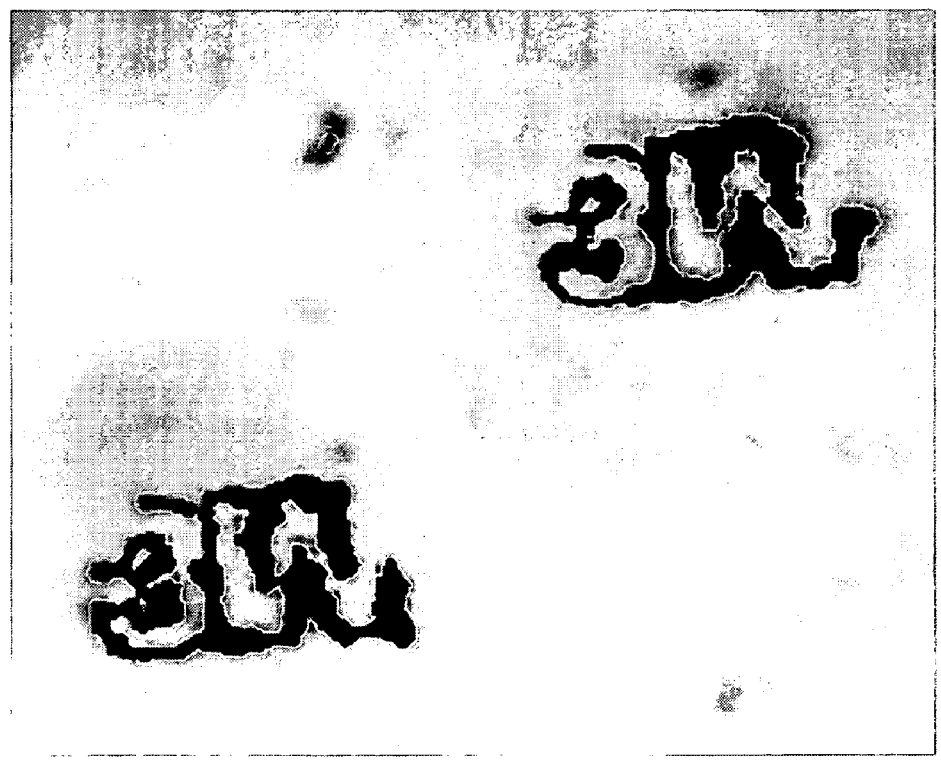
FIG. 7 is an optical micrograph of a microlens sheeting with a radiation sensitive material layer made of aluminum film that has been imaged to provide a composite image that appears to float below the sheeting in accordance with the present invention.

After imaging, depending upon the size of the extended object, a full or partial image of the object will be present in the radiation sensitive material behind each microsphere. The extent to which the actual object is reproduced as an image behind a microsphere depends on the energy density incident upon the microsphere. Portions of an extended object may be distant enough from a region of microlenses that the energy incident upon those microspheres has an energy density lower than the level of radiation required to modify that material. Moreover, for a spatially extended image, when imaging with a fixed NA lens, not all portions of the sheeting will be exposed to the incident radiation for all parts of the extended object. As a result, those portions of the object will not be modified in the radiation sensitive medium and only a partial image of the object will appear behind the microspheres. FIG. 5 is a perspective view of a section of a microlens sheeting depicting sample images formed in the radiation sensitive layer adjacent to individual microspheres, and further showing that the recorded images range from complete replication to partial replication of the composite image. FIGS. 6 and 7 are optical micrographs of a microlens sheeting imaged according to this invention, in which the radiation sensitive layer is an aluminum layer. As shown therein some of the images are complete, and others are partial.

These composite images can also be thought of as the result of the summing together of many images, both partial and complete, all with different perspectives of a real object. The many unique images are formed through an array of miniature lenses, all of which "see" the object or image from a different vantage point. Behind the individual miniature lenses, a perspective of the image is created in the material layer that depends on the shape of the image and the direction from which the imaging energy source was received. However, not everything that the lens sees is recorded in the radiation sensitive material. Only that portion of the image or object seen by the lens that has sufficient energy to modify the radiation sensitive material will be recorded.

The "object" to be imaged is formed through the use of an intense light source by either tracing the outline of the "object" or by the use of a mask. For the image thus recorded to have a composite aspect, the light from the object must radiate over a broad range of angles. When the light radiating from an object is coming from a single point of the object and is radiating over a broad range of angles, all the light rays are carrying information about the object, but only from that single point, though the information is from the perspective of the angle of the light ray. Now consider that in order to have relatively complete information about the object, as carried by the light rays, light must radiate over a broad range of angles from the collection of points that constitute the object. In this invention, the range of angles of the light rays emanating from an object is controlled by optical elements interposed between the object and the microlens material. These optical elements are chosen to give the optimum range of angles necessary to produce a composite image. The best selection of optical elements results in a cone of light whereby the vertex of the cone terminates at the position of the object. Optimum cone angles are greater than about 40 degrees.

The object is demagnified by the miniature lenses and the light from the object is focused onto the energy sensitive coating against the backside of the miniature lens. The actual position of the focused spot or image at the backside of the lens depends upon the direction of the incident light rays originating from the object. Each cone of light emanating from a point on the object illuminates a fraction of the miniature lenses and only those miniature lenses illuminated with sufficient energy will record a permanent image of that point of the object.

Geometrical optics will be used to describe the formation of various composite images according to the present invention. As noted previously, the imaging processes described below are preferred, but not exclusive, embodiments of the invention.

A. Creating a Composite Image that Floats Above the Sheeting

Figure 8:
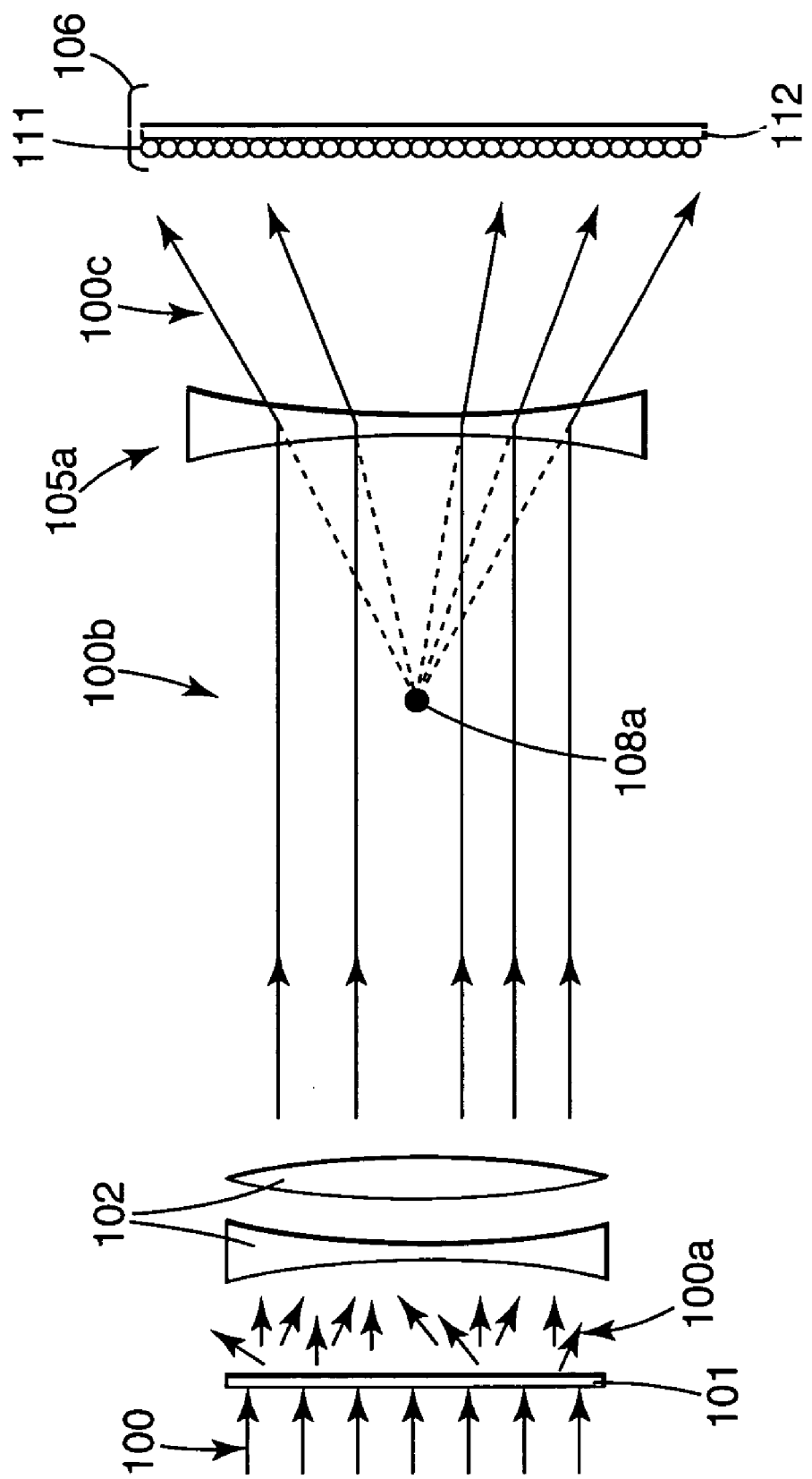
FIG. 8 is a geometrical optical representation of the formation of a composite image that appears to float above the microlens sheeting.

Referring to FIG. 8, incident energy 100 (light, in this example) is directed onto a light diffuser 101 to homogenize any non-uniformities in the light source. The diffusely scattered light 100a is captured and collimated by a light collimator 102 that directs the uniformly distributed light 100b towards a diverging lens 105a. From the diverging lens, the light rays 100c diverge toward the microlens sheeting 106.

The energy of the light rays impinging upon the microlens sheeting 106 is focused by the individual microlenses 111 onto the material layer (a radiation sensitive coating 112, in the illustrated embodiment). This focused energy modifies the radiation sensitive coating 112 to provide an image, the size, shape, and appearance of which depends on the interaction between the light rays and the radiation sensitive coating.

The arrangement shown in FIG. 8 would provide a sheeting having a composite image that appears to an observer to float above the sheeting as described below, because diverging rays 100c, if extended backward through the lens, would intersect at the focal point 108a of the diverging lens. Stated differently, if a hypothetical "image ray" were traced from the material layer through each of the microspheres and back through the diverging lens, they would meet at 108a, which is where the composite image appears.

B. Viewing a Composite Image that Floats Above the Sheeting

Figure 9:
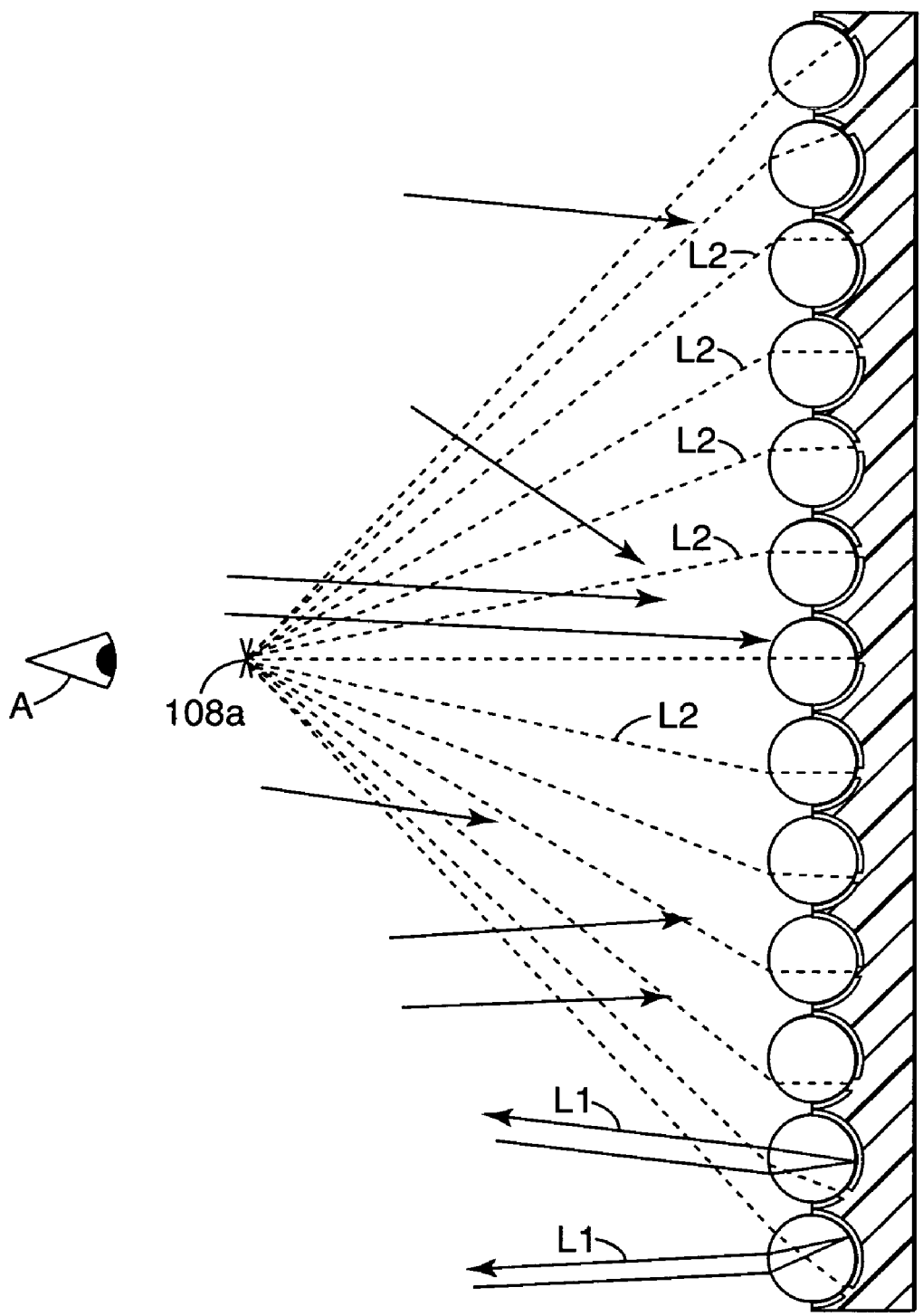
FIG. 9 is a schematic representation of a sheeting having a composite image that appears to float above the inventive sheeting when the sheeting is viewed in reflected light.

A sheeting that has a composite image may be viewed using light that impinges on the sheeting from the same side as the observer (reflected light), or from the opposite side of the sheeting as the observer (transmitted light), or both. FIG. 9 is a schematic representation of a composite image that appears to the unaided eye of an observer A to float above the sheeting when viewed under reflected light. An unaided eye may be corrected to normal vision, but is not otherwise assisted by, for example, magnification or a special viewer. When the imaged sheeting is illuminated by reflected light, which may be collimated or diffuse, light rays are reflected back from the imaged sheeting in a manner determined by the material layer struck by the light rays. By definition, the images formed in the material layer appear different than the non-imaged portions of the material layer, and thus an image can be perceived.

For example, light L1 may be reflected by the material layer back toward the observer. However, the material layer may not reflect light L2 back toward the observer well, or at all, from the imaged portions thereof. Thus, the observer may detect the absence of light rays at 108a, the summation of which creates a composite image that appears to float above the sheeting at 108a. In short, light may be reflected from the entire sheeting except the imaged portions, which means that a relatively dark composite image will be apparent at 108a.

It is also possible that the nonimaged material would absorb or transmit incident light, and that the imaged material would reflect or partially absorb incident light, respectively, to provide the contrast effect required to provide a composite image. The composite image under those circumstances would appear as a relatively bright composite image in comparison to the remainder of the sheeting, which would appear relatively dark. This composite image may be referred to as a "real image" because it is actual light, and not the absence of light, that creates the image at focal point 108a. Various combinations of these possibilities can be selected as desired.

Figure 10:
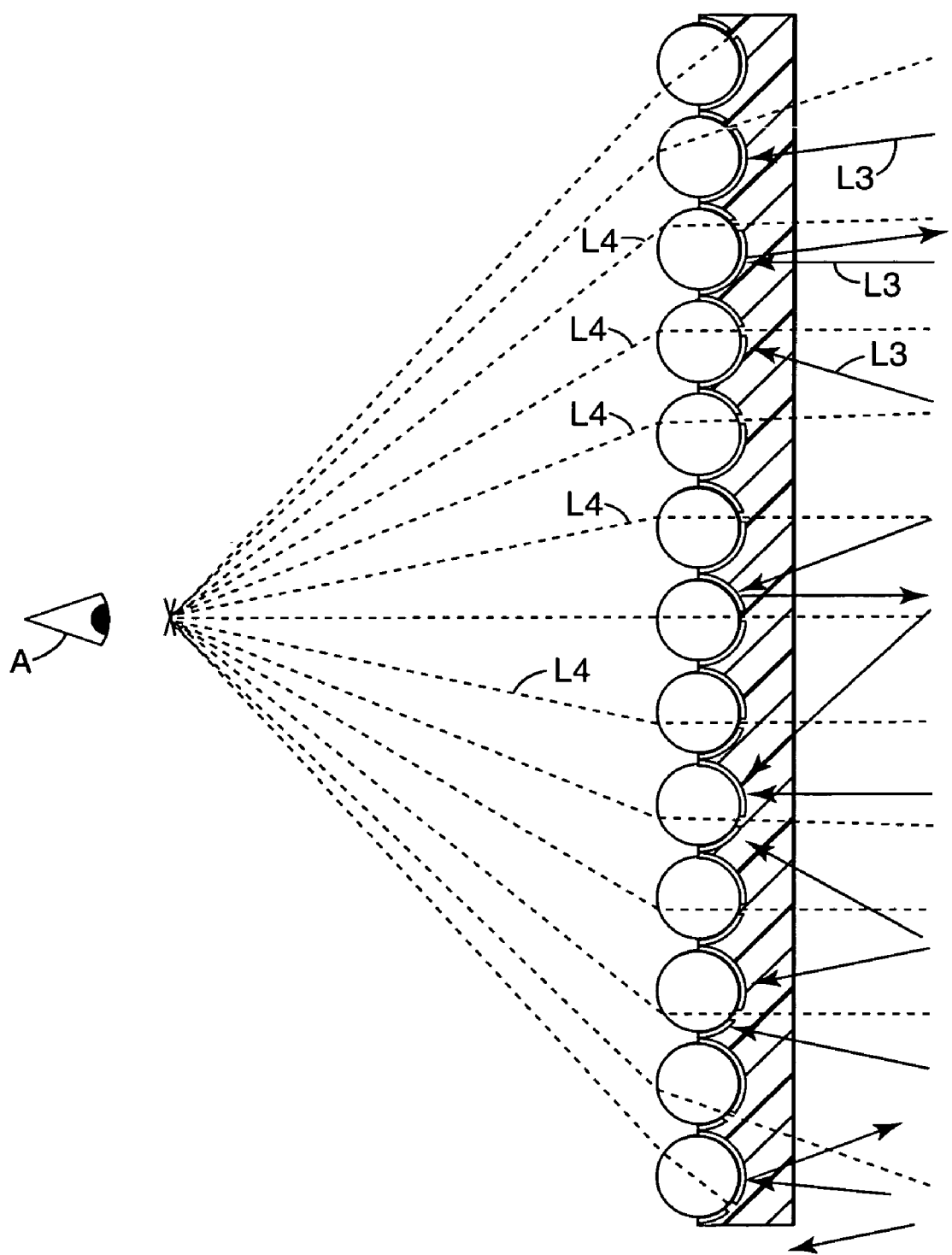
FIG. 10 is a schematic representation of a sheeting having a composite image that appears to float above the inventive sheeting when the sheeting is viewed in transmitted light.

Certain imaged sheetings can also be viewed by transmitted light, as shown in FIG. 10. For example, when the imaged portions of the material layer are translucent and the nonimaged portions are not, then most light L3 will be absorbed or reflected by the material layer, while transmitted light L4 will be passed through the imaged portions of the material layer and directed by the microlenses toward the focal point 108a. The composite image will be apparent at the focal point, where it will in this example appear brighter than the remainder of the sheeting. This composite image may be referred to as a "real image" because it is actual light, and not the absence of light, that creates the image at focal point 108a.

Alternatively, if the imaged portions of the material layer are not translucent but the remainder of the material layer is, then the absence of transmitted light in the areas of the images will provide a composite image that appears darker than the remainder of the sheeting.

C. Creating a Composite Image that Floats Below the Sheeting

Figure 11:
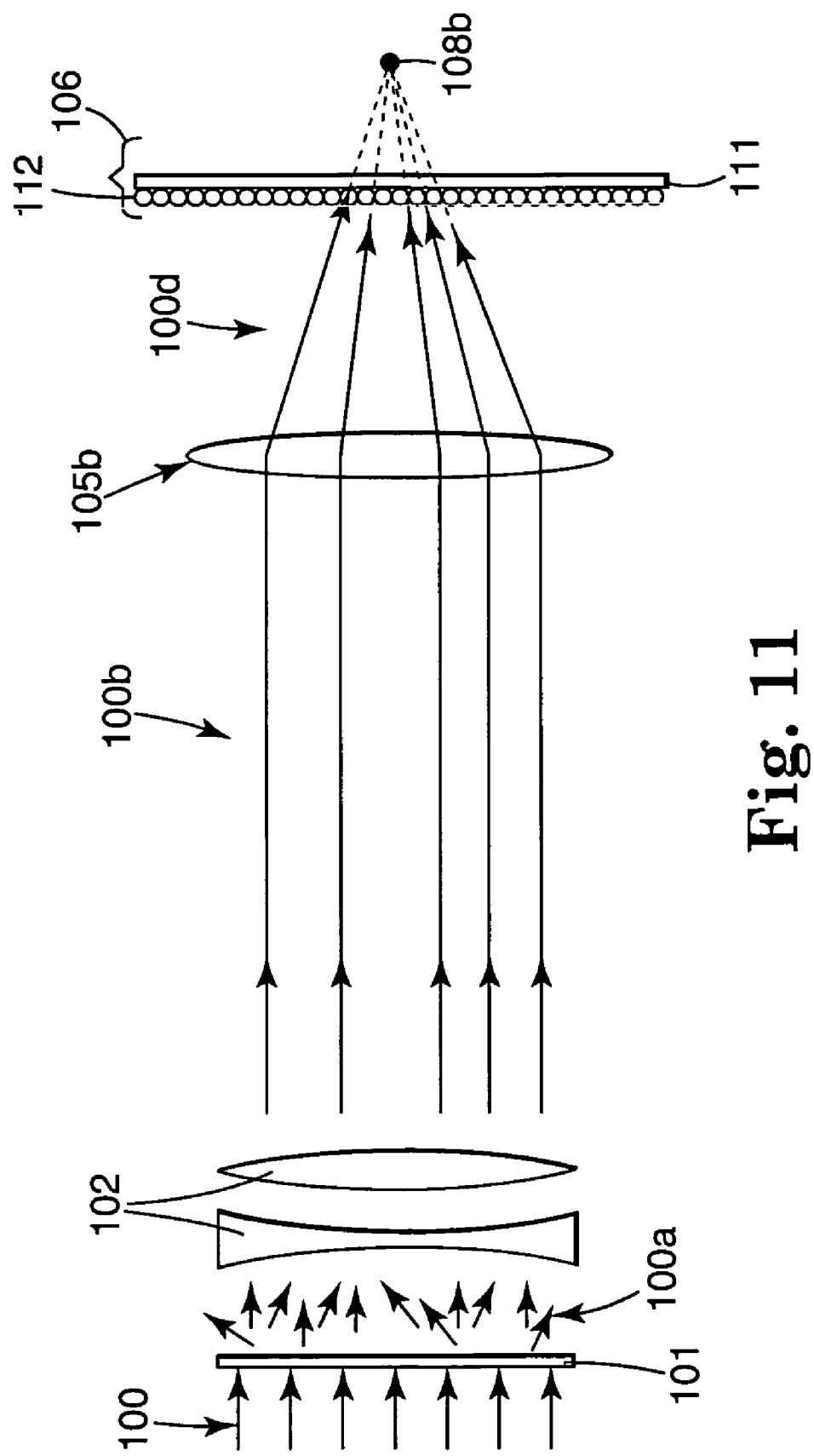
FIG. 11 is a geometrical optical representation of the formation of a composite image that when viewed will appear to float below the microlens sheeting.

A composite image may also be provided that appears to be suspended on the opposite side of the sheeting from the observer. This floating image that floats below the sheeting can be created by using a converging lens instead of the diverging lens 105 shown in FIG. 8. Referring to FIG. 11, the incident energy 100 (light, in this example) is directed onto a diffuser 101 to homogenize any non-uniformities in the light source. The diffuse light 100a is then collected and collimated in a collimator 102 that directs the light 100b toward a converging lens 105b. From the converging lens, the light rays 100d are incident on the microlens sheeting 106, which is placed between the converging lens and the focal point 108b of the converging lens.

The energy of the light rays impinging upon the microlens sheeting 106 is focused by the individual microlenses 111 onto the material layer (a radiation sensitive coating 112, in the illustrated embodiment). This focused energy modifies the radiation sensitive coating 112 to provide an image, the size, shape, and appearance of which depends on the interaction between the light rays and the radiation sensitive coating. The arrangement shown in FIG. 11 would provide a sheeting having a composite image that appears to an observer to float below the sheeting as described below, because converging rays 100d, if extended through the sheeting, would intersect at the focal point 108*b* of the diverging lens. Stated differently, if a hypothetical "image ray" were traced from the converging lens 105*b* through each of the microspheres and through the images in the material layer associated with each microlens, they would meet at 108*b*, which is where the composite image appears.

D. Viewing a Composite Image that Floats Below the Sheeting

Figure 12:
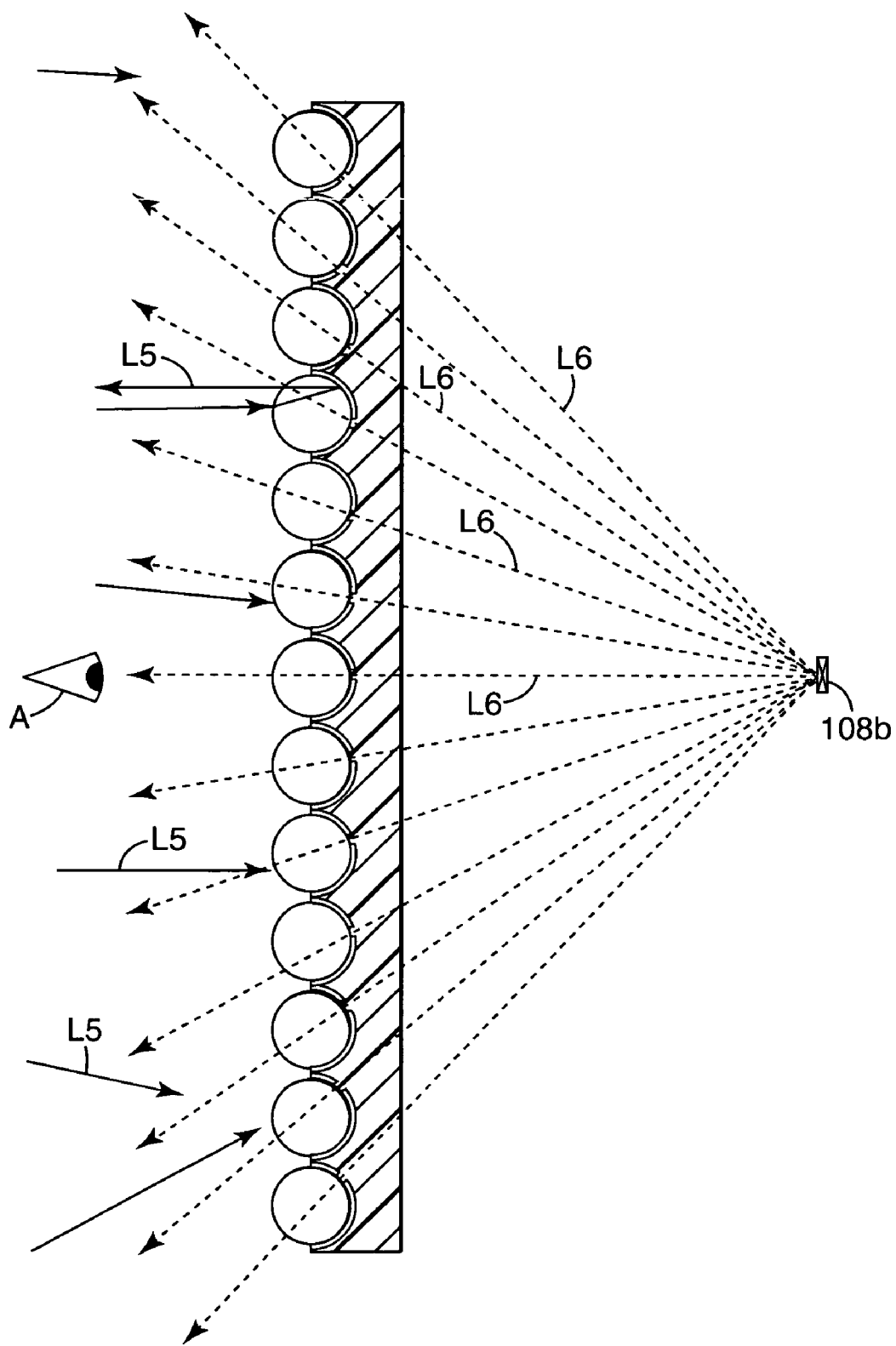
FIG. 12 is a schematic representation of a sheeting having a composite image that appears to float below the inventive sheeting when the sheeting is viewed in reflected light.

Sheeting having a composite image that appears to float below the sheeting can also be viewed in reflected light, transmitted light, or both. FIG. 12 is a schematic representation of a composite image that appears to float below the sheeting when viewed under reflected light. For example, light L5 may be reflected by the material layer back toward the observer. However, the material layer may not reflect light L6 back toward the observer well, or at all, from the imaged portions thereof. Thus, the observer may detect the absence of light rays at 108*b*, the summation of which creates a composite image that appears to float below the sheeting at 108*b*. In short, light may be reflected from the entire sheeting except the imaged portions, which means that a relatively dark composite image will be apparent at 108*b*.

It is also possible that the nonimaged material would absorb or transmit incident light, and that the imaged material would reflect or partially absorb incident light, respectively, to provide the contrast effect required to provide a composite image. The composite image under those circumstances would appear as a relatively bright composite image in comparison to the remainder of the sheeting, which would appear relatively dark. Various combinations of these possibilities can be selected as desired.

Figure 13:
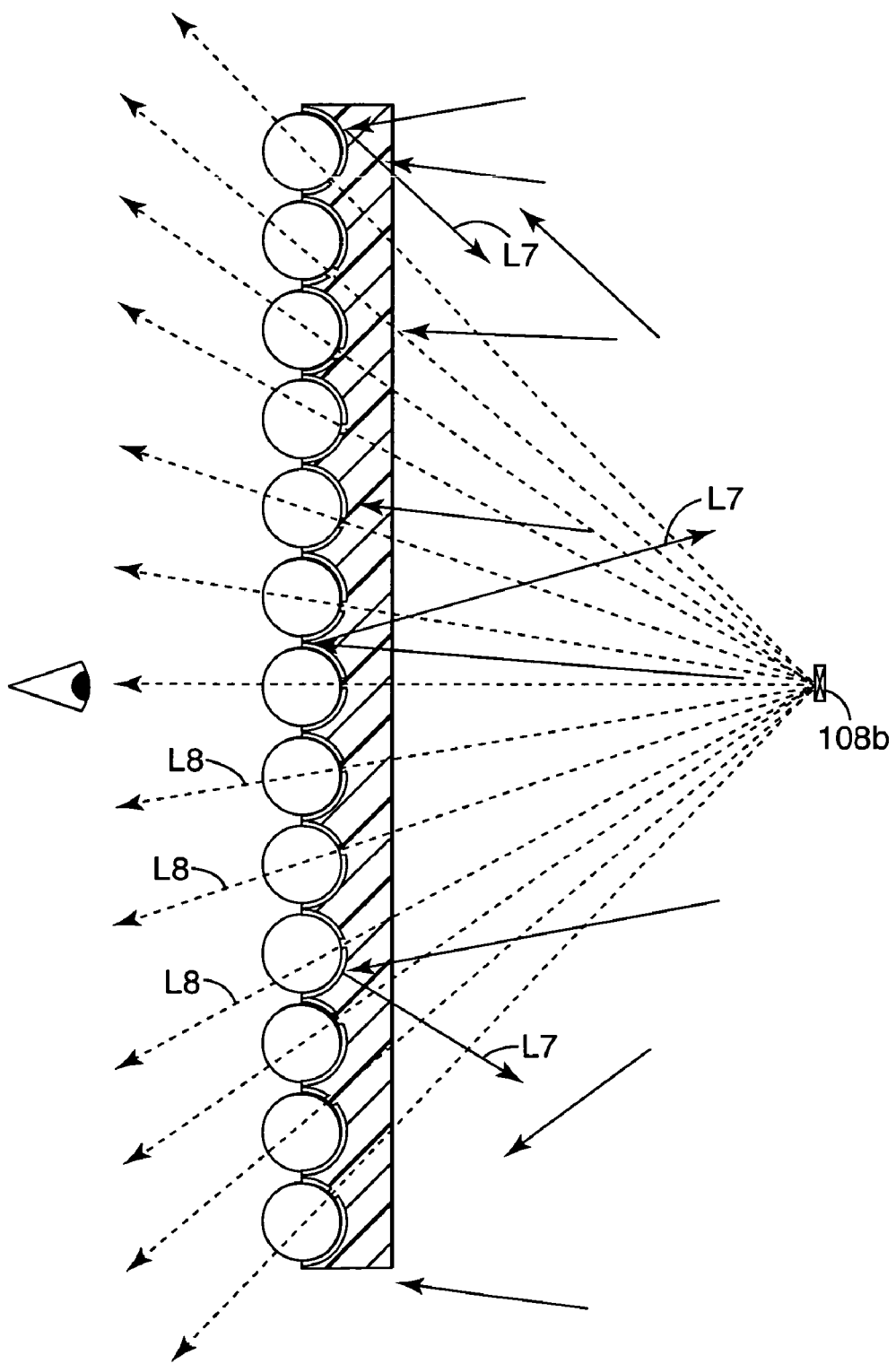
FIG. 13 is a schematic representation of a sheeting having a composite image that appears to float below the inventive sheeting when the sheeting is viewed in transmitted light.

Certain imaged sheetings can also be viewed by transmitted light, as shown in FIG. 13. For example, when the imaged portions of the material layer are translucent and the nonimaged portions are not, then most light L7 will be absorbed or reflected by the material layer, while transmitted light L8 will be passed through the imaged portions of the material layer. The extension of those rays, referred to herein as "image rays," back in the direction of the incident light results in the formation of a composite image at 108*b*. The composite image will be apparent at the focal point, where it will in this example appear brighter than the remainder of the sheeting.

Alternatively, if the imaged portions of the material layer are not translucent but the remainder of the material layer is, then the absence of transmitted light in the areas of the images will provide a composite image that appears darker than the remainder of the sheeting.

E. Complex Images

Composite images made in accordance with the principles of the present invention may appear to be either two-dimensional, meaning that they have a length and width, and appear either below, or in the plane of, or above the sheeting, or three-dimensional, meaning that they have a length, width, and height. Three-dimensional composite images may appear below or above the sheeting only, or in any combination of below, in the plane of, and above the sneeting, as desired. The term "in the plane of the sheeting" refers only generally to the plane of the sheeting when the sheeting is laid flat. That is, sheeting that isn't flat can also have composite images that appear to be at least in part "in the plane of the sheeting" as that phrase is used herein.

Three-dimensional composite images do not appear at a single focal point, but rather as a composite of images having a continuum of focal points, with the focal points ranging from one side of the sheeting to or through the sheeting to a point on the other side. This is preferably achieved by sequentially moving either the sheeting or the energy source relative to the other (rather than by providing multiple different lenses) so as to image the material layer at multiple focal points. The resulting spatially complex image essentially consists of many individual dots. This image can have a spatial extent in any of the three cartesian coordinates relative to the plane of the sheeting.

In another type of effect, a composite image can be made to move into a region of the microlensed sheeting where it disappears. This type of image is fabricated in a fashion similar to the levitation examples with the addition of placing an opaque mask in contact with the microlensed materials to partially block the imaging light for part of the microlensed material. When viewing such an image, the image can be made to move into the region where the imaging light was either reduced or eliminated by the contact mask. The image seems to "disappear" in that region.

The composite images formed according to the present invention can have very wide viewing angles, meaning that an observer can see the composite image across a wide range of angles between the plane of the sheeting and the viewing axis. Composite images formed in microlens sheeting comprised of a monolayer of glass microspheres having an average diameter of approximately 70-80 micrometers and, when using an aspheric lens with a numerical aperture of 0.64, are visible within a conical field of view whose central axis is determined by the optical axis of the incident energy. Under ambient lighting, the composite image so formed is viewable across a cone of about 80-90 degrees full angle. Utilizing an imaging lens with less divergence or lower NA can form smaller half angle cones.

Images formed by the process of this invention can also be constructed that have a restricted viewing angle. In other words, the image would only be seen if viewed from a particular direction, or minor angular variations of that direction. Such images are formed similar to the method described in Example One below, except that light incident on the final aspheric lens is adjusted so that only a portion of the lens is illuminated by the laser radiation.

The partial filling of the lens with incident energy results in a restricted cone of divergent light incident upon the microlensed sheeting. For aluminum coated microlens sheeting, the composite image appears only within a restricted viewing cone as a dark gray image on a light gray background. The image appears to be floating relative to the microlens sheeting.

EXAMPLES

This invention will be further explained by the following Examples, which may for convenience reference certain of the Figures.

Example One

This example describes an embedded lens sheeting with an aluminum material layer, and a composite image that appeared to float above the sheeting. An optical train of the type depicted in FIG. 14 was used to form the floating image. The optical train consisted of a Spectra Physics Quanta-RayT™ DCR-2(10) Nd:YAG laser 300 operating in a Q-switched mode at its fundamental wavelength of 1.06 micrometers. The pulse width of this laser is typically from 10-30 ns. Following the laser, the energy was redirected by a 99% reflective turning mirror 302, a ground glass diffuser 304, a 5× beam expansion telescope 306, and an aspheric lens 308 with a numerical aperture of 0.64 and a focal length of 39.0 mm. The light from the aspheric lens 308 was directed toward an XYZ stage 310. The stage was composed of three linear stages, and is available from Aerotech Inc. of Pittsburgh, Pa. under the designation ATS50060. One linear stage was used to move the aspheric lens along the axis between the aspheric focal point and the microlens sheeting (the z-axis), and the other two stages enabled the sheeting to be moved in two mutually orthogonal horizontal axes relative to the optical axis.

The laser light was directed toward the ground glass diffuser 304 to eliminate any beam inhomogeneities caused by thermal lensing. Immediately adjacent to the diffuser, a 5X beam expansion telescope 306 collimated the diverging light from the diffuser and enlarged the light beam to fill the aspherical lens 308.

In this example, the aspheric lens was positioned above the XY plane of the XYZ stage so that the focal point of the lens was 1 cm above the microlens sheeting 312. An apertured energy meter available from Gentec, Inc., of Saint-Fey, Quebec, Canada under the designation ED500 with a mechanical mask, was used to control the energy density at the plane of the sheeting. The laser output was adjusted to obtain approximately 8 milliJoules per square centimeter (8 mJ/cm$^2$) over the illuminated area of the energy meter 1 cm from the focal point of the aspheric lens. A sample of embedded lens sheeting 312 with an 80 nm thick aluminum radiation sensitive layer was affixed to the XYZ stage 310 so that the aluminum coated side faced away from the aspherical lens 308.

A controller available from Aerotech, Inc. of Pittsburgh, Pa. under the designation U21 provided the necessary control signals for movement of the XYZ stage 312 and control voltages for pulsing of the laser 300. The stages were moved by importing a CAD file into the controller with the x-y-z coordinate information, movement commands, and laser firing commands necessary to produce the image. An arbitrary complex composite image was formed by coordinating the movement of the X, Y and Z stages with the pulsing of the laser to trace the image in space above the microlensed material. The stage speed was adjusted to 50.8 centimeters/minute for a laser pulse rate of 10 Hz. This formed continuous composite lines in the aluminum layer adjacent the microlenses.

When the microlensed sheeting was viewed in ambient light, the images were dark gray against a light gray background. For a fixed 1 cm spacing between the focal point and the surface of the beaded sheeting, the resulting image was a planar composite image that appeared to float approximately 1 cm above the sheeting. Moreover, the composite image displayed reasonably large movement in relation to an observer's viewing perspective, so an observer could easily view different aspects of the composite image depending upon the viewing angle.

Example Two

In this example, an exposed lens sheeting construction with a transparent mirror radiation sensitive layer was used to form a composite image that appeared to float below the microlens sheeting. The optical train used in Example One was also used in this Example. The microlensed sheeting was positioned relative to the aspheric lens 308 so that the lens was nearly in contact with the microlens sheeting. The laser output was adjusted to achieve approximately 14 mJ/cm$^2$ directly beneath the aspheric lens. The exposed lens sheeting consisted of partially embedded microspheres as described in U.S. Pat. No. 3,801,183, with a zinc-sulfide (ZnS) dielectric mirror vapor deposited onto one side of the microspheres. The thickness of the ZnS layer was nominally 60 mu. As in Example One, the laser was operated at 10 Hz while the sheeting was moved at 50.8 cm/min, resulting in the formation of continuous composite lines in the microlensed sheeting. A "globe" pattern (a circle with four inscribed arcs) was traced by the staging system.

Under ambient lighting, the globe appeared as a dark image against a white/yellow background. The dark composite image appeared to float approximately 39 mm below the sheeting. The location of the composite image corresponded to the location of the focal point of the aspheric lens, which for this Example correlated to approximately 39 mm behind the lens.

Example Three

This Example describes forming a composite image in an exposed lens sheeting with an aluminum radiation sensitive layer using a lens array in place of a single aspheric lens. An optical train of the type depicted in FIG. 15 was used to form a floating composite image. The optical train consisted of a Q-switched laser 300, a 99% reflective mirror 302, an optical diffuser 304, and a beam expansion telescope 306. These components of the optical train used in this example are identical to those described in Example One. Also included in the optical train of this Example was a two-dimensional lens array 407, a reflective mask 409 and a negative bi-concave lens 411. Areas of the reflective mask 409 were transparent, to coincide with the areas of the microlensed material 412 to be exposed to the laser radiation, while the remaining surface of the mask was opaque or reflective.

The lens array 407 consisted of a fused silica refractive microlens array available from MEMS Optical, LLC of Huntsville, Ala. under the designation 3038. This closed packed spherical lens array was placed almost in contact with a negative biconcave lens 411 having a diameter of 75 mm and focal length of negative 150 mm. Exposed lens sheeting 412 with an 80 nm thick aluminum radiation sensitive layer was placed within 25 mm of the negative bi-concave lens 411. The microlensed material was placed approximately 1 cm from the focal length of the combined optical path of the mircrolens array and the negative bi-concave lens. The output from the laser was adjusted to produce approximately 4 mJ/cm$^2$ at the surface of the exposed lens surface of the microlensed sheeting. A single laser pulse was activated to expose the entire image.

The resulting imaged microlensed sheeting, when viewed in ambient light, revealed images that appeared to float approximately 1 cm above the sheeting. The image appeared dark gray against a light gray background.

Example Four

In this Example, the diverging light source was obtained by reflection from a scattering source. The scattering reflector consisted of a ceramic bead approximately 5 mm in diameter. An optical train of the type depicted in FIG. 16 was used in this Example. It consisted of a Q-switched Nd:YAG laser 500, similar to that described in Example One, followed by a telescope 502 which reduced the size of the incident laser beam to a diameter of approximately 1 mm. The light was then impinged upon the ceramic bead 504 at an angle sufficiently deviated from normal so as to illuminate approximately one quarter of the hemisphere of the ceramic bead 504 facing the microlens sheeting 512. This was confirmed by viewing the scattered radiation through an infrared camera.

The ceramic bead 504 was positioned above the XY stage 510 at a distance of approximately 25 mm. The incident light from the laser was adjusted to be parallel to the sample stage. Embedded lens sheeting 512 with an 80 nm aluminum radiation sensitive layer was affixed to an XY stage 510 and a controller provided control signals to the stage and laser. The laser output was adjusted to obtain approximately 8 mJ/cm$^2$ at the surface of the microlens sheeting. Illumination of the ceramic bead 504 was adjusted to obtain the most uniform light exposure to the surface of the microlensed sheeting 512. The XY stage 510 was moved at 50.8 cm/minute with the laser pulsing at 10 Hz. A complex image was traced out with the stage while the microlensed sheeting was exposed to the scattered radiation from the ceramic reflector.

In ambient light, a composite image floated approximately 25 mm above the sheeting, and appeared dark gray against a light gray background. The image had large movement relative to the observer's viewing position. Under transmitted light, a luminous composite image floated approximately 25 mm above the sheeting.

Example Five

In this example, the material layer of an embedded lens sheeting consisted of multilayer optical stacks, tuned for specific colors in the visible spectrum. On one face of the microlensed base sheet, thin film layers were deposited by vacuum evaporation and plasma polymerization to obtain a layer sequence consisting of chromium/plasma polymerized butadiene/silicon dioxide/aluminum, with the chromium layer being adjacent to the embedded lens. The thicknesses of the individual materials were adjusted to obtain colors in the red, green, and blue portions of the visible spectrum. Table 1 provides the specific thicknesses of the individual materials prepared.

TABLE 1

| | Multilayer Construction | | | | |
|---|---|---|---|---|---|
| Sample | Cr (nm) | PP (nm) | SiO$_2$ (nm) | Al (nm) | Color |
| 1 | 4 | 97 | 0 | 80 | Blue |
| 2 | 4 | 65 | 65 | 80 | Light Blue |
| 3 | 4 | 89 | 65 | 80 | Green |
| 4 | 4 | 165 | 20 | 80 | Red/Blue |

The coated microlens base sheets were then laminated to a backing with the multilayers in contact with the laminating material. The liner of the microlens sheeting was then removed to expose the front surface of the embedded lenses with colors given by the above table.

An optical train as described in Example One was used to image the samples of this example. In this example, the focal point of the asphere was positioned 1 cm above the microlens sheeting. The laser output was adjusted to obtain an energy density of 5 mJ/cm$^2$ at the surface of the microlens sheeting. The optical properties of the multilayer stacks were modified in the regions irradiated. A globe pattern was traced to provide images in the multilayer stacks in a manner similar to that described in Example One.

In ambient lighting, the irradiated regions appeared light yellow to orange in color against the background color of the microlensed sheeting. All composite images appeared to float above the sheeting and move relative to the observer.

Example Six

This example describes a second type of multilayer tuned stack as the radiation sensitive layer for producing a colored composite image. The optical stacks were prepared on a microlensed base sheet consisting of embedded lens sheeting. On one face of the microlensed base sheets, thin film layers were deposited by vacuum evaporation to obtain a layer sequence consisting of chromium/cryolite/aluminum (Cr/Na$_3$AlF$_6$/Al), chromium/silicon dioxide/aluminum (Cr/SiO$_2$/Al), or chromium/magnesium fluoride/aluminum (Cr/MgF$_2$/Al), as shown in Table 2, below. The thicknesses of the dielectric materials, SiO$_2$, Na$_3$AlF$_6$ and MgF$_2$, were adjusted to obtain a variety of colors in the visible spectrum. Table 2 provides the specific thicknesses of the individual materials prepared in the various samples.

TABLE 2

| | Multilayer Construction | | | | | | |
|---|---|---|---|---|---|---|---|
| Sample | Cr Thickness (nm) | Na$_3$AlF$_6$ Thickness (nm) | SiO$_2$ Thickness (nm) | MgF$_2$ Thickness (nm) | Al Thickness (nm) | Color | Imaging Energy Density (mJ/cm$^2$) |
| A | 4.8 | 200 | 0 | 0 | 83 | Blue | 12.7 |
| B | 4.2 | 0 | 135 | 0 | 83 | Deep Blue | 8.6 |
| C | 4.2 | 0 | 0 | 259 | 83 | Aquagreen | 8.6 |
| D | 4.2 | 0 | 275 | 0 | 83 | Violet | 7.5 |
| E | 4.2 | 0 | 160 | 0 | 83 | Green | 7.5 |
| F | 4.2 | 0 | 225 | 0 | 83 | Orange-tan | 7.5 |

The coated microlens base sheets were then laminated to a backing such that the multilayer was in contact with the laminating material. The liner of the microlens sheeting was then removed to expose the front surface of the embedded lenses with colors given by the above table.

An optical train as described in Example One was used to image these samples. In this example, the position of the final aspheric lens was positioned to be almost in contact with the sample to provide a composite image that appeared to float below the sheeting. The laser energy was adjusted to obtain an energy density that would permanently alter the optical properties of the respective multilayer stacks, as shown in Table 2. The alphanumeric characters "SAMPLE" were traced for the image in this material in a manner similar to that described in Example One. In ambient lighting, the composite image appeared dark with a white/yellow outline against the background color of the microlensed sheeting. All composite images appeared to float approximately 39 mm below the sheeting and to move with respect to an observer viewing the sheeting.

Example Seven

In this example, a color composite image was formed in an embedded lens sheeting using a phase change alloy of 50 atomic percent Silver and 50 atomic percent of Zinc ($Ag_{50}Zn_{50}$) and a tuned bilayer stack consisting of chromium and silicon dioxide as the radiation sensitive layer. The phase change alloy was not ablated by the applied radiation, while the tuned bilayer enhances the spectral reflectance in the blue portion of the visible electromagnetic spectrum. The radiation sensitive layer was deposited onto the spacer layer of the enclosed lens sheeting in a manner similar to the procedure used to deposit the thin film layers of the multilayer stack unto the microlensed base sheet in Example Five. First, the chromium and silicon dioxide layers were vacuum deposited onto the polymeric spacer layer to thicknesses of 40 nm and 260 nm, respectively. Next, an 80 nm thick layer of $Ag_{50}Zn_{50}$ alloy was sputter deposited onto the silicon dioxide layer. The samples were then laminated and stripped to expose the clear portion of the microlens sheeting.

The sheeting, when viewed under ambient (reflected) light, appeared to be violet-blue. An optical train similar to Example One was used to image the $Ag_{50}Zn_{50}$ radiation sensitive layer. In place of the Q-switched laser, a continuous wave Nd:YAG laser operating at a wavelength of 1.06 um, was used as the energy source. The pulse width was controlled by the use of an acousto-optic modulator in the optical train. The first order diffraction beam was sent through an optical train of the type depicted in FIG. 14. Samples of the enclosed lens sheeting were affixed to an XYZ stage. The laser power into the acousto-optic modulator was adjusted to give 810 mW of power at the microlensed material. The acousto-optic modulator was set to achieve 20 Hz pulsing at 100 microsecond pulse widths. A positive aspheric lens, as described in Example One, was placed 12 mm above the surface of the microlensed material. An image was traced out with the XYZ stage while the laser radiation exposed the radiation sensitive layer.

When the sheeting was viewed in ambient lighting, the imaged regions appeared light blue in color and floated about 12 mm above the microlens sheeting.

Example Eight

In this Example, a replicated lens structure with a copper radiation sensitive layer was used as the microlens sheeting. Replicated sheeting of the type described in U.S. Pat. No. 5,254,390 was used as the microlens sheeting. A radiation sensitive layer of copper was vacuum evaporated on to the flat surface of the sheeting to a thickness of 80 nm. The microreplicated microlensed material was exposed to laser radiation from an optical train as described in Example One. The final aspheric lens was positioned with the focal point 6.5 mm away from the surface of the microlensed material. The laser output was adjusted to give approximately 7 $mJ/cm^2$ at the surface of the sheeting. The laser was set to pulse at 10 Hz while the XYZ staging moved at a speed of 50.8 cm/minute. A "globe" pattern (a circle with four inscribed arcs) was traced above the sample.

When the sheeting was viewed in ambient lighting, a whitish image of a floating globe could be seen against the copperish color of the radiation sensitive layer. This composite image appeared to float about 6 mm above the sheeting.

Example Nine

This Example describes the combination of a planar composite image with a composite image that appeared to float below the sheeting. Exposed lens microlens sheeting with an 80 nm thick aluminum radiation sensitive layer was imaged using the optical configuration described in Example One. The aspheric lens was positioned nearly in contact with the microlens sheeting, and the laser output was adjusted to yield 4 $mJ/cm^2$ at the sample surface. The controller was programmed to trace the alphanumeric characters "SAMPLE." An absorptive mask was placed on top of the open sheeting. This mask was made by printing rows of the alphanumeric characters "3M" onto transparency sheets by way of a conventional photocopier. The alphanumeric characters absorbed the radiation while the surrounding areas would transmit the laser radiation. The exposed lens sheeting with this absorptive mask was positioned so that the "SAMPLE" characters were formed over the top of the mask position.

When viewed under ambient lighting, the characters "SAMPLE" appeared to float about 39 mm below the sheeting, while the unexposed characters "3M" appeared to be in the plane of the sheeting. The "3M" characters were only observable against the dark characters from the "SAMPLE" characters.

Example Ten

This Example describes a sheeting with a complex, three-dimensional image. An embedded lens microlens sheeting with an 80 nm thick aluminum radiation sensitive layer was used in this Example. The optical train used in Example One was used. The microlensed sheeting was attached to the XY plane of an XYZ translation stage, while an aspheric lens was attached to the z-axis. The aspheric lens had a NA of 0.64 and a focal length of 39 mm. The controller was programmed to trace the outline of an isometric cube with 5 cm long cube diagonals (the distance between two opposite corners of the cube). The relative position and orientation of the cube as programmed in the controller placed one end of the composite cube image approximately 5 mm above the surface of the sheeting, and the other end of the composite cube image 5.5 cm above that surface. The cube image was oriented to place a corner of the cube closest to the observer.

During the tracing of the isometric cube, the energy per pulse from the laser was controlled to yield a constant energy density of 8 mJ/cm$^2$ at the sample surface regardless of the spacing between the diverging lens and the sheeting. The laser operated at 10 Hz and X, Y and Z stages moved at a speed of 50.8 cm/minute. The image of the isometric cube was continuously traced out in space above the microlensed sheeting by the controller.

When viewed in ambient lighting, the isometric composite cube image appeared dark gray against a light gray background, floating from between 5 mm and 5.5 cm above the surface. Furthermore, as an observer changed his or her viewing perspective, the isometric cube appeared to rotate in space above the microlens sheeting to expose sides of the cube that were previously obscured at different viewing angles.

Example Eleven

This Example describes a floating image that can be made to disappear. That is, the composite image can, by changing the viewing angle, be made to disappear from or reappear to view. An embedded lens sheeting with an 80 nm thick aluminum radiation sensitive layer was used. An optical train similar to that in Example One was used to form the images, and the distance of the aspheric lens from the sheeting was adjusted to position the focal point 1 cm above the microlensed sheeting. The controller was programmed to produce a "globe" pattern (a circle with four inscribed arcs) and the laser output was adjusted to provide 8 mJ/cm$^2$ at the sample surface. On the sample itself, a square section of translucent tape was attached to the surface of the embedded lens sheeting. The square section of tape was positioned so that during the imaging of the globe, a portion of the area imaged by the laser would overlap the section covered by the translucent tape.

When the imaged sheeting was viewed under ambient light, a floating globe pattern was observed as a dark gray image against a light gray background, floating 1 cm above the sheeting. By varying the viewing angle, the "globe" moved into or out of the region that was masked by the translucent tape. When the globe moved into the masked region, the portion of the globe in that region disappears. When the globe moved out of the masked region, the portion of the globe in that region reappeared. The composite image did not merely fade gradually away as it passed into the masked region, but rather completely disappeared exactly when it passed into that region.

Imaged sheeting containing the composite images of this invention are distinctive and impossible to duplicate with ordinary equipment. The composite images can be formed in sheeting that is specifically dedicated to applications such as passports, identification badges, banknotes, identification graphics, and affinity cards. Documents requiring verification can have these images formed on the laminated sheeting for identification, authenticity, and enhancement. Conventional bonding means such as lamination, with or without adhesives, may be used. Providers of items of value, such as boxed electronic products, compact discs, driver's licenses, title documents, passports or branded products, may simply apply the multilayer film of this invention to their products and instruct their customers only to accept as authentic items of value so labeled. For products requiring these protections, their appeal may be enhanced by the inclusion of sheeting containing composite images into their construction or by adhering such sheeting to the products. The composite images may be used as display materials for advertising, for license plates, and for numerous other applications in which the visual depiction of a unique image is desirable. Advertising or information on large objects, such as signs, billboards, or semitrailers, would draw increased attention when the composite images were included as part of the design.

Sheeting with the composite images has a very striking visual effect, whether in ambient light, transmitted light, or retroreflected light in the case of retroreflective sheeting. This visual effect can be used as a decoration to enhance the appearance of articles to which the imaged sheeting is attached. Such an attachment could convey a heightened sense of fashion or style and could present a designer logo or brand in a very dramatic way. Envisioned uses of the sheeting for decoration include applications to apparel, such as everyday clothing, sports clothing, designer clothing, outerwear, footwear, caps, hats, gloves and the like. Similarly, fashion accessories could utilize imaged sheeting for decoration, appearance, or brand identity. Such accessories could include purses, wallets, briefcases, backpacks, fanny packs, computer cases, luggage, notebooks and the like. Further decorative uses of the imaged sheeting could extend to a variety of objects that are commonly embellished with a decorative image, brand, or logo. Examples include books, appliances, electronics, hardware, vehicles, sports equipment, collectibles, objects of art and the like.

When the decorative imaged sheeting is retroreflective, fashion or brand awareness can be combined with safety and personal protection. Retroreflective attachments to apparel and accessories are well known and enhance the visibility and conspicuity of the wearer in low-light conditions. When such retroreflective attachments incorporate the composite imaged sheeting, a striking visual effect can be achieved in ambient, transmitted, or retroreflected light. Envisioned applications in the area of safety and protective apparel and accessories include occupational safety apparel, such as vests, uniforms, firefighter's apparel, footwear, belts and hardhats; sports equipment and clothing, such as running gear, footwear, life jackets, protective helmets, and uniforms; safety clothing for children; and the like.

Attachment of the imaged sheeting to the aforementioned articles can be accomplished by well known techniques, as taught in U.S. Pat. No. 5,691,846 (Benson, Jr. et al.), U.S. Pat. No. 5,738,746 (Billingsley et al.), U.S. Pat. No. 5,770,124 (Marecki et al.), and U.S. Pat. No. 5,837,347 (Marecki), the choice of which depends on the nature of the substrate material. In the case of a fabric substrate, the sheeting could be die cut or plotter cut and attached by sewing, hot-melt adhesive, mechanical fasteners, radio frequency welding or ultrasonic welding. In the case of hardgoods, a pressure-sensitive adhesive may be a preferred attachment technique.

In some cases, the image may be best formed after the sheeting is attached to a substrate or article. This would be especially useful when a custom or unique image was desired. For example, artwork, drawings, abstract designs, photographs, or the like could be computer generated or digitally transferred to a computer and imaged on the sheeting, the unimaged sheeting having been previously attached to the substrate or article. The computer would then direct the image generation equipment as described above. Multiple composite images may be formed on the same sheeting, and those composite images may be the same or different. Composite images may also be used along with other conventional images such as printed images, holograms, isograms, diffraction gratings, kinegrams, photographs, and the like. The image may be formed in the sheeting before or after the sheeting is applied to an article or object.

Translucent and Transparent Laminates

In certain embodiments, a sheeting may utilize one or more layers of translucent or transparent laminates as materials or combinations of materials into which a floating image may be formed. For convenience, the invention will be described with respect to translucent materials; however, a range of materials may be used for the sheeting, including translucent materials, semi-translucent materials, and transparent materials. The sheeting may form a construction that maintains a complete or semi-translucent property, i.e., that allows light to pass through the construction to some extent.

Translucent laminates may be combined with other functional materials. For example, a finished construction may be adhesively or mechanically applied to an article. The overall combined article may be translucent, opaque, or a combination thereof. Translucent laminates may be constructed from a variety of single- or multi-layer materials or combinations of these materials. For example, such materials may include dyed or pigmented colored films, multilayer optical films, and interference films. Such a translucent laminate may include a single layer of clear, dyed, or pigmented polyethylene terephthalate (PET), silicone, acrylate, polyurethane or other such material, with a layer of radiation sensitive material, disposed adjacent the first layer, into which an image is formed. Another example is a layer of material, having optical elements (e.g., lenses) formed on a surface of the layer, onto which a second material is transferred by a laser material transfer process or other printing-like process.

Figure 17:
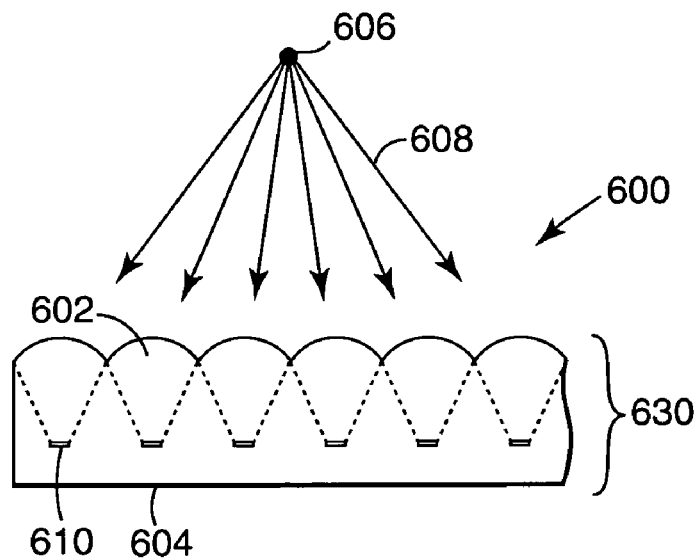
FIG. 17 is an enlarged cross sectional view of an example sheeting that contains a single layer of microlenses.

In some embodiments, the floating images of the invention may be formed within a single layer of a translucent laminate itself, formed due to microlenses on a surface of the single layer without requiring an adjacent layer of material. FIG. 17 is an enlarged cross sectional view of a sheeting 600 that contains a single layer 630 of material having microlenses 602 formed on a surface thereof. That is, layer 630 may be formed as a single layer of material, having a surface of microlenses, and may have a thickness sufficient to be self-supporting, making an additional substrate unnecessary.

In the illustrated embodiment of FIG. 17, sheeting 600 comprises a transparent plano-convex or aspheric sheeting having first and second sides, the second side 604 being substantially planar and the first side having an array of substantially hemi-spheroidal or hemi-aspheroidal microlenses 602 formed thereon. The shape of the microlenses 602 and the thickness of the layer 630 are selected such that collimated light 608 incident to the array is focused at regions 610 within the single layer 630. The thickness of layer 630 depends at least in part on the characteristics of the microlenses 602, such as the distance at which the microlenses focus light. For example, microlenses may be used that focus light at a distance of 60 μm from the front of the lens. In some embodiments, the thickness of layer 630 may be between 20-100 μm. Microlenses 602 may be formed of clear or colored PET, silicone, acrylate, polyurethane, polypropylene or other material, by a process such as embossing or microreplication.

Incident energy, such as light 608 from energy source 606, is directed towards sheeting 600. The energy of the light rays impinging upon sheeting 600 is focused by the individual microlenses 602 to regions 610 within layer 630. This focused energy modifies layer 630 at regions 610 to provide an image, the size, shape, and appearance of which depends on the interaction between the light rays 608 and microlenses 602. For example, light rays 608 may form respective partial images, associated with each of the microlenses, at respective damage sites within layer 630 as a result of photodegradation, charring, or other localized damage to layer 630. Regions 610 may in some examples be referred to as "photodegradation portions." The individual images may be formed of black lines caused by the damage. The individual images formed in the material, when viewed by an observer under reflected or transmitted light, provide a composite image that appears to be suspended, or float, above, in the plane of, and/or below the sheeting.

A radiation source, as described above with respect to Part III, may be used to form the individual images at regions 610 within layer 630 of sheeting 600. For example, a high peak power radiation source may be used. One example of a radiation source that may be used to image the sheeting is a regeneratively amplified titanium:sapphire laser. For example, a titanium:sapphire laser operating at a wavelength of 800 nm with a pulse duration of approximately 150 femtoseconds and a pulse rate of 250 Hz may be used to form the images within the sheeting.

Figure 18:
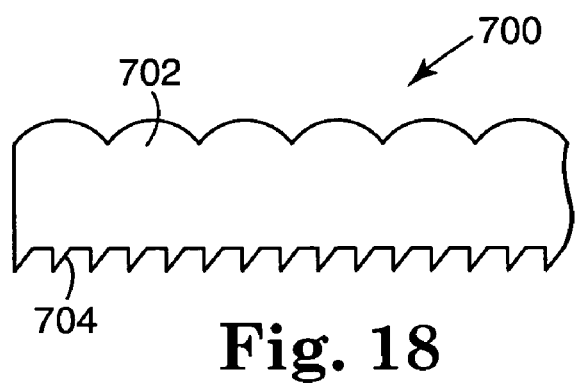
FIG. 18 is an enlarged cross sectional view of an example sheeting having an array of microlenses on a first side and a retroreflective portion on a second side.

In some embodiments, the described sheeting may possess optical microstructures on both sides. FIG. 18 is an enlarged cross sectional view of an exemplary sheeting 700 having an array of substantially hemi-spheroidal or hemi-aspheroidal microlenses 702 on a first side and a retroreflective portion 704 on a second side. As shown in FIG. 18, retroreflective portion 704 may be an array of corner cubes. However, other types of retroreflective surfaces or non-retroreflective optical structures may be formed on the surface of the second side of sheeting 700 opposite microlenses 702.

For example, the second side of sheeting 700 may contain diffractive elements, e.g., a diffractive grating, to provide a color-shifting capability or other optical functions. As another example, the second side may be comprised of partial corner cubes, lenticular lens arrays, additional lenslet arrays, compound optical layers, or other optical elements formed within the surface of the second side of sheeting 700. Moreover, the optical microstructures on the second side of sheeting 700 may be uniform or variable in location, period, dimension, or angle, to provide a variety of optical effects. The optical microstructures may also be coated with a semi-transparent layer of metal. As a result of these variations, sheeting 700 may provide an image on a color-shifting background or may provide added optical functionality.

In another embodiment, microlenses 702 may be formed within only a portion of the first side of sheeting 700, while retroreflective portion 704 covers substantially all of the second side of sheeting 700. In this manner, an observer viewing sheeting 700 from the first side may see both a floating image and areas that appear retroreflective. Sheeting 700 could be used as a security feature by checking retroreflectivity of the sheeting. In certain embodiments, retroreflective portion 704 may contain corner cubes, and corners of those corner cubes may be bent so as to give a "sparkly" appearance in the portion not covered by microlenses 702.

Individual images associated with each of the plurality of microlenses 702 may be formed within sheeting 700 as described above with respect to FIG. 17. In one embodiment, sheeting 700 may be a two-sided microstructure in which microlenses 702 and retroreflective portion 704 are constructed on opposite surfaces a single layer of material. In another embodiment, microlenses 702 and retroreflective portion 704 may be two separate layers of material affixed together, such as by lamination. In this case, the individual images may be formed at locations between the layer associated with microlenses 702 and the layer associated with retroreflective portion 704. Alternatively, a layer of radiation-sensitive material may exist between the layer associated with microlenses 702 and the layer associated with retroreflective portion 704, on which the individual images are formed.

Figure 19A:
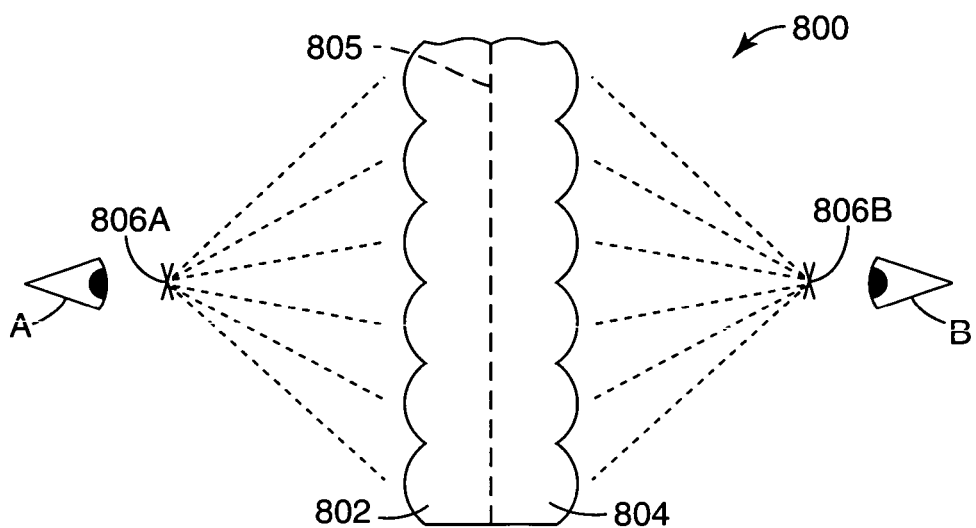
FIG. 19A is a schematic representation of an example sheeting having microlens arrays on both sides of the sheeting, and a composite image that appears to an observer on either side of the sheeting to float above the inventive sheeting.

A two-sided, single-layer sheeting with microstructures on both sides and having a composite image may be viewed under reflected light or transmitted light, or both. FIG. 19A is a schematic representation of a sheeting 800 having a first side 802 and a second side 804, each of the first and second sides having an array of substantially hemi-spheroidal or hemi-aspheroidal microlenses. Sheeting 800 presents composite images 806A and 806B ("composite images 806") based on the viewing position of an observer. For example, composite images 806A, 806B appear to an observer A on the first side of sheeting 800 and an observer B on the second side of sheeting 800, respectively, to float above (i.e., in front of) the sheeting 800 when viewed under reflected light. Composite images 806 are formed by the sum of individual images formed in sheeting 800 in a manner similar to that described above with respect to images formed within a layer of material adjacent a layer of microlenses.

Individual images may be formed at regions 805 in sheeting 800. For example, individual images may be formed as above by incident energy from an energy source that modifies sheeting 800 at regions 805. Each of regions 805 may correspond to a respective microlens formed on first side 802, or to a respective microlens formed on second side 804, or both. In one embodiment, the microlenses formed on first side 802 may be selected to focus light rays incident to first side 802 to a region 805 substantially in the middle of sheeting 800. As a result, composite images 806 produced by the individual images formed at regions 805 may be viewed by observer A on the first side 802 of sheeting 800, or by observer B on the second side 804 of sheeting 800. In one embodiment, the microlenses formed on first side 802 and second side 804 line up laterally and are substantially equal in terms of thickness and focal length so as to allow the composite image within sheeting 800 to be visible from either side of the sheeting 800.

The composite image 806A seen by observer A may be different in some ways from the composite image 806B seen by observer B. For example, where the composite images 806 include features having visual depth, the apparent depth of the features may be reversed. In other words, features appearing closest to observer A may appear farthest to observer B. Although not illustrated, in other embodiments a composite image formed by individual images at regions 805 may float in the plane of the sheeting, below the sheeting, and/or be viewable under transmitted light.

Figure 19B:
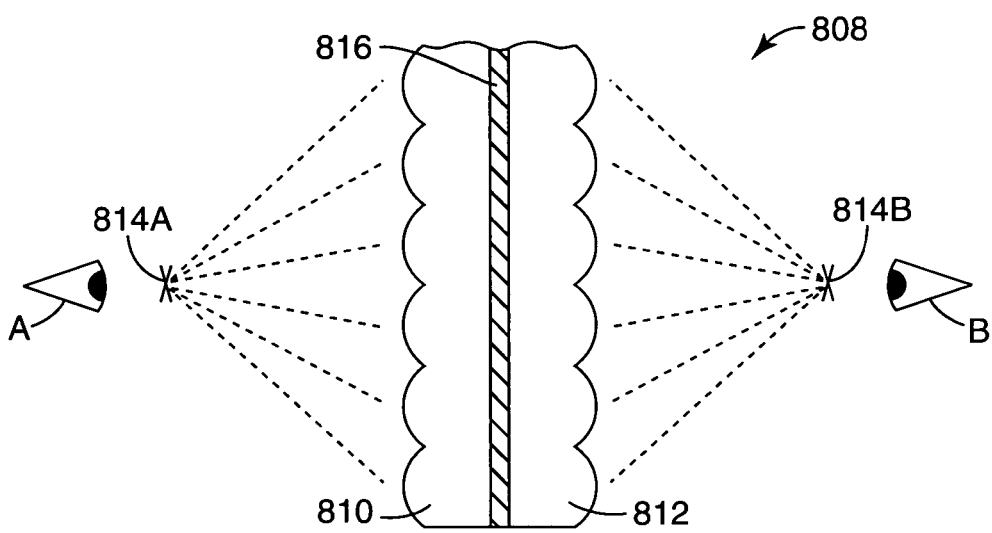
FIG. 19B is a schematic representation of an example sheeting comprising a first microlens layer, a second microlens layer, and a layer of material disposed between the first and second microlens layers.

FIG. 19B is a schematic representation of a multi-layer sheeting 808 comprising a first layer 810 having microlenses formed on a surface thereof, a second layer 812 similarly having microlenses formed on a surface thereof, and a layer of material 816 disposed between the first and second microlens layers. The outer surfaces of layers 810, 812 may include an array of substantially hemi-spheroidal or hemi-aspheroidal microlenses. Layer of material 816 may be a transparent material.

As described above with respect to FIG. 19A, sheeting 808 presents composite images 814A and 814B ("composite images 814"). Composite images 814 appear to an observer A on the first side of sheeting 808 and an observer B on the second side of sheeting 808, respectively, to float above the sheeting 808 when viewed under reflected light. Composite images 814 are produced by the sum of individual images formed in the layer of material 816, as described above. Layer of material 816 may be a radiation sensitive material as described above in Part II. As another example, layer of material 816 may be a transparent laser-markable material, such as a doped polycarbonate layer on which a laser beam forms black marks. In one embodiment, layers 810, 812 may be attached by lamination. Layer of material 816 may comprise coatings, films, or other types of layers. For example, layer of material 816 may be a metallic spacer, a dielectric spacer, a corner-cube spacer, a diffraction grating spacer, a multilayer optical film (MOF), or a compound optical spacer. Multiple layers of material of different kinds or colors may be provided in place of layer of material 816. In some embodiments, different images may be formed within layer of material 816 from each side, and as a result, different floating images may be visible to observers A and B. In another embodiment, images may be formed at regions within one of first layer 810 and second layer 812.

FIGS. 19A and 19B illustrate sheetings having a composite image that appears to an observer on either side of the sheeting to float above the sheeting. In some embodiments, the sheeting may provide a two-dimensional or three-dimensional composite image that appears on both sides of the sheeting. Such a sheeting may find application as an enhanced security feature, and also provide brand enhancement, brand authentication, and eye-catching appeal.

Figure 20:
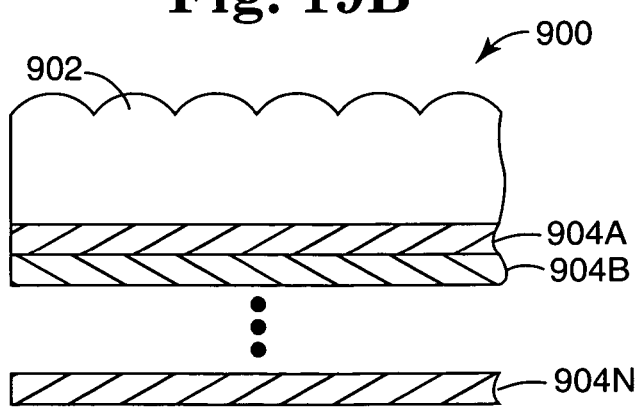
FIG. 20 is an enlarged cross sectional view of an example sheeting having a microlens layer and a plurality of additional translucent layers.

FIG. 20 is an enlarged cross-sectional view of a sheeting 900 including a layer 902 having microlenses formed in a surface thereof and a plurality of additional translucent layers 904A-904N ("translucent layers 904"). Layer 902 may be substantially similar to layer 630 of FIG. 17. That is, as described above, layer 902 may constitute a single layer of sufficient thickness so that individual images may be formed within layer 902. Additional translucent layers 904 may be added to sheeting 900 to produce added visual appearance (e.g., color, contrast, color-shift) and function. Translucent layers 904 may be layers having optical structures, e.g., lenses, corner cubes, lenticular lens arrays, positioned within the optical stack to add effects such as color shifting and function. For example, a diffractive grating may add color shifting effects, while lenses may provide imaging functionality. Sheeting 900 may be used to provide a high contrast white floating image on a continuously variable color background. The individual images formed in the material, when viewed by an observer under reflected or transmitted light, provide a composite image that appears to be suspended, or float, above, in the plane of, and/or below the sheeting.

As discussed above, a number of configurations are possible for translucent microlens sheetings. For example, a sheeting may include a spacer that results in images misaligned with respect to the lens array. This may produce movement of the image orthogonal to the movement of the observer relative to the substrate. As another example, a single layer of microlenses may be formed from energy-absorption-appropriate materials. A protective topcoat may be added to a sheeting to add durability. Such a topcoat may be colored or transparent, and may enhance image appearance and provide a mechanism with which to produce a uniform background color. The layer having microlenses on a surface or the additional translucent layers may be dyed or pigmented. The pigment colors may be customized.

The sheeting may provide an enhanced contrast floating image on a semi-transparent substrate, or a translucent color image on a translucent substrate. The sheeting may provide multi-sided color shifting floating images with tunable color shifting and tunable optical effects as a function of viewing angle or incident lighting angle. The sheeting may provide the ability to selectively form images within substrates via wavelengths. The microreplicated optical structures of a sheeting may be band-pass microreplicated optical structures, such as colored glass band-pass or interference band-pass microreplicated optical structures. Such structures may be capable of single or multi-wavelength image formation, or may allow for secure image formation with unique wavelengths. Creating a band-pass substrate may provide both security and visual utility. Security value may be added by increasing the number of laser systems needed to reproduce a multi-colored floating image.

The microlens sheeting may be an "embedded-lens" type of sheeting in which the microsphere lenses are embedded in a transparent protective overcoat, which is typically a polymeric material. Clear or colored glass or polymer beads may be substituted for the microreplicated lens optics in the embodiments described above. For example, beads may be bonded on multilayer optical films (MOF) on both sides, with the MOF and bead size additionally being varied. As another example, beads may be bonded on a dielectric spacer on both sides. The beads may be bonded to both sides of a diffraction grating spacer, with the diffraction grating blaze and periodic structure being varied. The beads may be metal-coated beads bonded to both sides of a diffraction grating spacer. The grating may be varied from 2D to 3D grating. Periodic structures may be added to the gratings to influence diffractive orders, viewing angles, and the like. The above features may also be selectively combined to achieve a sheeting having a desired effect.

The translucent laminates described above may be incorporated in backlit applications, or may be applied in constructions that incorporate colored, white, or variable lighting elements, variable intensity lighting, light guides, fiber-delivered light, color filters, fluorescent or phosphorescent materials. These lighting conditions may be designed to change the appearance of the image or the overall substrate in time, via user interaction, or via environmental conditions. In this manner, the construction provides a dynamically varying floating image with variably visible information content.

The single and multi-layer sheetings using translucent layers, as described above, may be used in a number of applications, including security documents and consumer decorative applications. For example, the floating image of the sheeting may be used for a floating watermark as a translucent overlay, providing a secure feature through which printed information is visible. The sheeting may be made very thin (<1 mm), which may enable integration of the sheeting into security documents, passports, drivers licenses, currency, banknotes, identification cards, titles, personnel badges, proofs of purchase, authenticity certificates, corporate cards, financial transaction cards (e.g. credit cards), certificates, brand and asset protection labels, registration tags, tax stamps, gaming chips, license plates, validation stickers, or other items.

The sheetings may also be incorporated into materials used by creative designers. As another example, the sheeting may be incorporated into computer cases, keyboards, numeric key pads, or computer displays.

Example Twelve

The following example describes results obtained from a series of experiments. In this example, an image was formed in a microreplicated acrylate lens sheeting, similar to the sheeting depicted in FIG. 17. A solution was cast at a thickness of 75 microns on a 125-micron thick kapton film containing a microlens pattern. The solution was composed of 75% by weight Photomer 6210 (aliphatic urethane acrylate, Cognis Corporation, Cincinnati, Ohio)/25% by weight 1,6-hexanediol diacrylate (UCB Chemicals, Smyrna, Ga.) containing 1% TPO-L photoinitiator (BASF Corporation, Florham Park, N.J.). The coated film was cured by exposure in a nitrogen-purged environment to the output of a Fusion D lamp. The microlens pattern was composed of 30-micron diameter lenses in a hexagonal pattern with a lens spacing of 34 microns. Each microlens had an aspheric shape described by a radius of curvature of 18.7 microns and a conic constant of −0.745. Measurements indicated that these microlenses had an effective focal length of approximately 60 microns at a wavelength of 800 nm.

Virtual images were drawn in this 75-micron thick acrylate sheet by exposing the sheet to the output of a regeneratively amplified titanium:sapphire laser (Spectra-Physics Hurricane) operating at a wavelength of 800 nm with a pulse duration of approximately 150 femtoseconds and a pulse rate of 250 Hz. The laser beam used to draw the image had an average power in the range of 10-100 mW, depending on the image float height, and was focused by an aspheric lens operating at an f-number of approximately 1.

These conditions resulted in virtual images composed of black lines, with float heights of 1-10 mm above the surface, on the clear, colorless background provided by the acrylate sheeting. Cross-sectional micrographs of the sheeting indicated that the black lines in the virtual images were formed by the integration of microimages behind the appropriate microlenses. Each microimage appeared to be composed of patterns of black material formed in the acrylate sheeting where the laser light focused by the microlenses reached intensities higher than the breakdown intensity of the polymer ($\sim 10^{17}$ W/m$^2$).

Various modifications and combinations of the embodiments disclosed will be apparent to those skilled in the art, and those modifications are intended to be within the scope of the invention as defined in the appended claims.

We claim:

1. A sheeting comprising:
 a layer of material having a surface of microlenses that form one or more images at positions internal to the layer of material, wherein at least one of the images is a partially complete image, and each of the images is associated with a different one of the microlenses, and
 wherein the microlenses have refractive surfaces that transmit light to positions within the layer of material to produce a composite image from the images formed within the layer of material so that the composite image appears to float above the sheeting, float below the sheeting, or float in the plane of the sheeting.

2. The sheeting of claim 1, wherein the layer of material has a thickness that exceeds a focal length of the microlenses so that a focus point of an energy source applied to the sheeting is located within the layer of material.

3. The sheeting of claim 1, wherein the images within the layer of material comprise photodegradation portions of the layer of material.

4. The sheeting of claim 1, wherein the layer of material has a thickness between 20-100 μm.

5. The sheeting of claim 1, further comprising one or more translucent layers disposed adjacent to the layer of material.

6. The sheeting of claim 5, wherein at least one of the translucent layers comprises an optical structure layer.

7. The sheeting of claim 5, wherein at least one of the translucent layers comprises a diffractive grating.

8. The sheeting of claim 1, wherein the microlenses cause the composite image to appear to move relative to the sheeting as a viewing position changes relative to the sheeting.

9. The sheeting of claim 1, wherein the layer of material has a thickness sufficient to be self-supporting without requiring a substrate.

10. The sheeting of claim 1, wherein the composite image is a two-dimensional image or a three-dimensional image.

11. The sheeting of claim 1, wherein the sheeting is applied to a security document.

12. A sheeting comprising:
a single layer of material having microlenses formed on a first side and a retroreflective portion formed on a second side opposite the microlenses,
wherein the layer of material includes one or more images formed between the microlenses and the retroreflective portion, and
wherein the microlenses produce a composite image that appears to float above the sheeting, float below the sheeting, or float in the plane of the sheeting.

13. The sheeting of claim 12, wherein the retroflective portion and the microlenses comprise two separate layers laminated together.

14. The sheeting of claim 12, wherein the microlenses extends over at least a portion of the first side of the layer of material, and wherein the retroreflective portion extends over substantially all of the second side of the layer of material.

15. The sheeting of claim 12, wherein the retroreflective portion comprises an array of corner cubes.

16. A sheeting comprising:
a layer of material having a surface of microlenses;
a retroreflective layer; and
a radiation-sensitive layer disposed between the layer of material and the retroreflective layer,
wherein the radiation-sensitive layer includes one or more images formed between the layer of material and the retroreflective portion, and
wherein the microlenses produce, from the images of the radiation-sensitive layer, a composite image that appears to float above the sheeting, float below the sheeting, or float in the plane of the sheeting.

17. A sheeting having first and second sides, comprising:
a first layer of material having a surface of microlenses; and
a second layer of material having a surface of microlenses disposed proximate to the first layer, wherein one or more images are formed within the sheeting at locations between the microlenses of the first layer and the microlenses of the second layer, wherein at least one of the images is a partially complete image, wherein each image is associated with one of a plurality of microlenses of the first layer,
wherein the microlenses have refractive surfaces that transmit light to positions within the sheeting to produce a composite image from the images that appears to float above the sheeting, float below the sheeting, or float in the plane of the sheeting, and
wherein the microlenses of the first layer and the microlenses of the second layer are aligned such that the composite image can be viewed from both the first side and the second side of the sheeting.

18. The sheeting of claim 17, further comprising a transparent radiation sensitive layer between the first layer of material and the second layer of material, wherein the images are formed within the transparent radiation sensitive layer.

19. The sheeting of claim 17, wherein the images are formed within one of the first layer of material and the second layer of material.

20. A sheeting having first and second sides, comprising:
a single layer of material having a first surface of microlenses and a second surface of microlenses formed opposite the first surface of microlenses,
wherein the single layer of material includes one or more images formed internally to the single layer of material, and
wherein, from the images, the first surface of microlenses and the second surface of microlenses produce a composite image that can be viewed from both the first side and the second side of the sheeting.

* * * * *

UNITED STATES PATENT AND TRADEMARK OFFICE
CERTIFICATE OF CORRECTION

PATENT NO. : 7,336,422 B2  
APPLICATION NO. : 11/399695  
DATED : February 26, 2008  
INVENTOR(S) : Dunn et al.

Page 1 of 1

It is certified that error appears in the above-identified patent and that said Letters Patent is hereby corrected as shown below:

Column 9  
Line 48, Delete "galvometric" and insert -- galvametric --, therefor.

Column 10  
Line 7, Delete "microlense" and insert -- microlens --, therefor.

Column 13  
Line 60, Delete "sneeting," and insert -- sheeting, --, therefor.

Column 14  
Line 64, Delete "RayT$^{TM}$" and insert -- Ray$^{TM}$ --, therefor.

Column 16  
Line 13, Delete "mu." and insert -- nm. --, therefor.  
Line 58, Delete "mircrolens" and insert -- microlens --, therefor.

Column 18  
Line 25, Delete "energy." and insert -- energy --, therefor.

Column 29  
Line 24, in Claim 13, delete "retroflective" and insert -- retroreflective --, therefor.

Signed and Sealed this

Ninth Day of September, 2008

JON W. DUDAS  
*Director of the United States Patent and Trademark Office*